US010742564B2

(12) United States Patent
Flomen et al.

(10) Patent No.: US 10,742,564 B2
(45) Date of Patent: Aug. 11, 2020

(54) DEVICE, SYSTEM, AND METHOD OF RTP PACKET TRANSMISSION AND ANALYSIS OF VOICE-OVER-IP COMMUNICATIONS

(71) Applicant: AudioCodes Ltd., Lod (IL)

(72) Inventors: Felix Flomen, Savyon (IL); Oren Klimker, Shoham (IL)

(73) Assignee: AUDIOCODES LTD., Lod (IL)

( * ) Notice: Subject to any disclaimer, the term of this patent is extended or adjusted under 35 U.S.C. 154(b) by 117 days.

(21) Appl. No.: 16/132,421

(22) Filed: Sep. 16, 2018

(65) Prior Publication Data

US 2020/0092217 A1   Mar. 19, 2020

(51) Int. Cl.
| | |
|---|---|
| *H04L 1/00* | (2006.01) |
| *H04L 12/875* | (2013.01) |
| *H04L 29/06* | (2006.01) |
| *H04L 12/863* | (2013.01) |
| *H04L 12/26* | (2006.01) |
| *H04L 12/823* | (2013.01) |

(52) U.S. Cl.
CPC ........ *H04L 47/56* (2013.01); *H04L 29/06517* (2013.01); *H04L 29/06523* (2013.01); *H04L 43/0829* (2013.01); *H04L 47/32* (2013.01); *H04L 47/54* (2013.01); *H04L 65/608* (2013.01)

(58) Field of Classification Search
None
See application file for complete search history.

(56) References Cited

U.S. PATENT DOCUMENTS

| 7,804,817 B1* | 9/2010 | Peshkin ................. G10L 25/78 370/351 |
| 2002/0027923 A1* | 3/2002 | Tokunaga ............ H04J 3/0632 370/401 |

(Continued)

OTHER PUBLICATIONS

ITU-T—Telecommunication Standardization Sector of ITU, Recommendation ITU-T G.107, Series G: transmission systems and media, digital systems and networks, International telephone connections and circuits—Transmission planning and the E-model, The E-model: a computational model for use in transmission planning, Jun. 2015.

(Continued)

*Primary Examiner* — Bob A Phunkulh
(74) *Attorney, Agent, or Firm* — Eitan Mehulal Sadot

(57) ABSTRACT

Device, system, and method of Voice over Internet Protocol (VoIP) communications, and particularly of Real Time Protocol (RTP) communication. In order to improve quality-of-service or quality-of-experience for a group of VoIP calls that are served by a VoIP router, each VoIP transmitter implements and adds a pseudo-random waiting-period prior to transmitting each outgoing RTP packet, or otherwise re-orders or mixes or shuffles the order of channels of RTP packets that are buffered or queued for transmission. Accordingly, no particular VoIP channel suffers from repeated drops of its RTP packets at the VoIP router. Additionally, VoIP network analyzers operate to measure the overall VoIP network overuse, or the average RTP packet loss rate of multiple VoIP channels, based on measuring RTP packet loss rate of a single VoIP channel which enforces a random pre-transmission waiting-period.

10 Claims, 6 Drawing Sheets

(56) References Cited

U.S. PATENT DOCUMENTS

| | | | | | |
|---|---|---|---|---|---|
| 2002/0145999 | A1* | 10/2002 | Dzik | | H04L 29/06027 370/352 |
| 2004/0066753 | A1* | 4/2004 | Grovenburg | | H04L 43/00 370/252 |
| 2004/0066775 | A1* | 4/2004 | Grovenburg | | H04J 3/0682 370/350 |
| 2006/0221936 | A1* | 10/2006 | Rauchwerk | | H04J 3/0632 370/352 |
| 2006/0268865 | A1* | 11/2006 | Yokota | | H04L 29/06027 370/389 |
| 2007/0127466 | A1* | 6/2007 | Seon | | H04M 7/0069 370/389 |
| 2007/0153772 | A1* | 7/2007 | Shankar J | | H04L 43/0858 370/352 |
| 2009/0201990 | A1* | 8/2009 | Leprovost | | H04N 21/234327 375/240.12 |
| 2010/0091748 | A1* | 4/2010 | Endoh | | H04L 29/06027 370/338 |
| 2011/0199890 | A1* | 8/2011 | Sadan | | H04W 84/10 370/216 |
| 2011/0261831 | A1* | 10/2011 | Sharma | | H04L 47/17 370/412 |
| 2013/0077632 | A1* | 3/2013 | Ishiguro | | H04L 65/605 370/394 |
| 2013/0343381 | A1* | 12/2013 | Klimker | | H04L 65/605 370/389 |
| 2014/0334484 | A1* | 11/2014 | Klimker | | H04L 65/605 370/352 |
| 2014/0362850 | A1* | 12/2014 | Wakely | | H04M 7/0066 370/352 |
| 2016/0080220 | A1* | 3/2016 | Winningham | | H04L 65/1006 370/352 |
| 2018/0324237 | A1* | 11/2018 | Johansson | | H04L 65/605 |

OTHER PUBLICATIONS

ITU-T—Telecommunication Standardization Sector of ITU, ITU-T Recommendation P.800, Series P: telephone transmission quality, Methods for objective and subjective assessment of quality, Methods for subjective determination of transmission quality, Aug. 1996.

ITU-T—Telecommunication Standardization Sector of ITU, ITU-T Recommendation P.862, Series P: telephone transmission quality, telephone installations, local line networks, Methods for objective and subjective assessment of quality, Perceptual evaluation of speech quality (PESQ): An objective method for end-to-end speech quality assessment of narrow-band telephone networks and speech codecs, Feb. 2001.

ITU-T—Telecommunication Standardization Sector of ITU, ITU-T Recommendation P.863, Series P: telephone transmission quality, telephone installations, local line networks, Methods for objective and subjective assessment of quality, Perceptual objective listening quality prediction, Mar. 2018.

The Internet Society—Network Working Group, Request for Comments (RFC) 3550, RTP: A Transport Protocol for Real-Time Applications, Jul. 2003.

\* cited by examiner

DEVICE, SYSTEM, AND METHOD OF RTP PACKET TRANSMISSION AND ANALYSIS OF VOICE-OVER-IP COMMUNICATIONS

FIELD

Some embodiments relate to the field of telecommunications.

BACKGROUND

Millions of people use electronic devices on a daily basis, such as, desktop computers, laptop computers, smartphones, tablets, or the like. Such devices are utilized for a variety of purposes, for example, to send and receive electronic mail (email) messages, to capture audio clips and video clips, to consume audio clips and video clips, to play games, to perform online transactions and electronic commerce transactions, and for other purposes.

Some devices are utilized for Voice over Internet Protocol (IP) communication. For example, a first user utilizes a first smartphone to talk with a second user who utilizes a second smartphone; and at least part of the voice communication is facilitated by transporting packets over an Internet Protocol (IP) network, such as the public Internet, rather than via the Public Switched Telephone Network (PSTN).

SUMMARY

The present invention comprises devices, systems, and methods of transmission of Real-Time Transport Protocol (RTP) packets, particularly for VoIP communication.

For example, in order to improve quality-of-service (QoS) or quality-of-experience (QoE) for a group of VoIP calls that are served by a VoIP router, each VoIP transmitting device or VoIP end-point and/or the VoIP relay unit may implement, add or enforce a random or pseudo-random pre-transmission waiting-period prior to transmitting each outgoing RTP packet of different VoIP channels; or, such VoIP relay element (e.g., gateway, Session Border Controller (SBC), router, network switch, or other VoIP device) may implement other mechanism which re-orders or mixes RTP packet in an RTP transmission queue, such that RTP packets enter the RTP transmission queue at a first VoIP channel order but exit the RTP transmission queue at a second, different, VoIP channel order (and wherein the set of RTP packets, within each VoIP channel, maintain their original order). In implementations that utilize randomized pre-transmission waiting periods, the time-lengths of the pre-transmission waiting-periods (prior to RTP packet transmission) are evenly distributed across multiple RTP packets of multiple senders (multiple VoIP channels). Accordingly, no single particular VoIP channel suffers (or, no particular group or subset of VoIP users or VoIP channels suffer) from repeated drops of its RTP packets at the VoIP router (or at other VoIP network element) when VoIP network overuse occurs. Additionally, VoIP network analyzers may operate as end-point devices that similarly enforce and add a randomized pre-transmission waiting period, and measure the overall VoIP network overuse and/or the overall RTP packet loss rate of a group of VoIP channels, based on measuring RTP packet loss rate in the single VoIP channel utilized by the VoIP network analyzers.

Embodiments of the present invention may provide other and/or additional benefits or advantages.

DETAILED DESCRIPTION OF SOME DEMONSTRATIVE EMBODIMENTS

Figure 1:
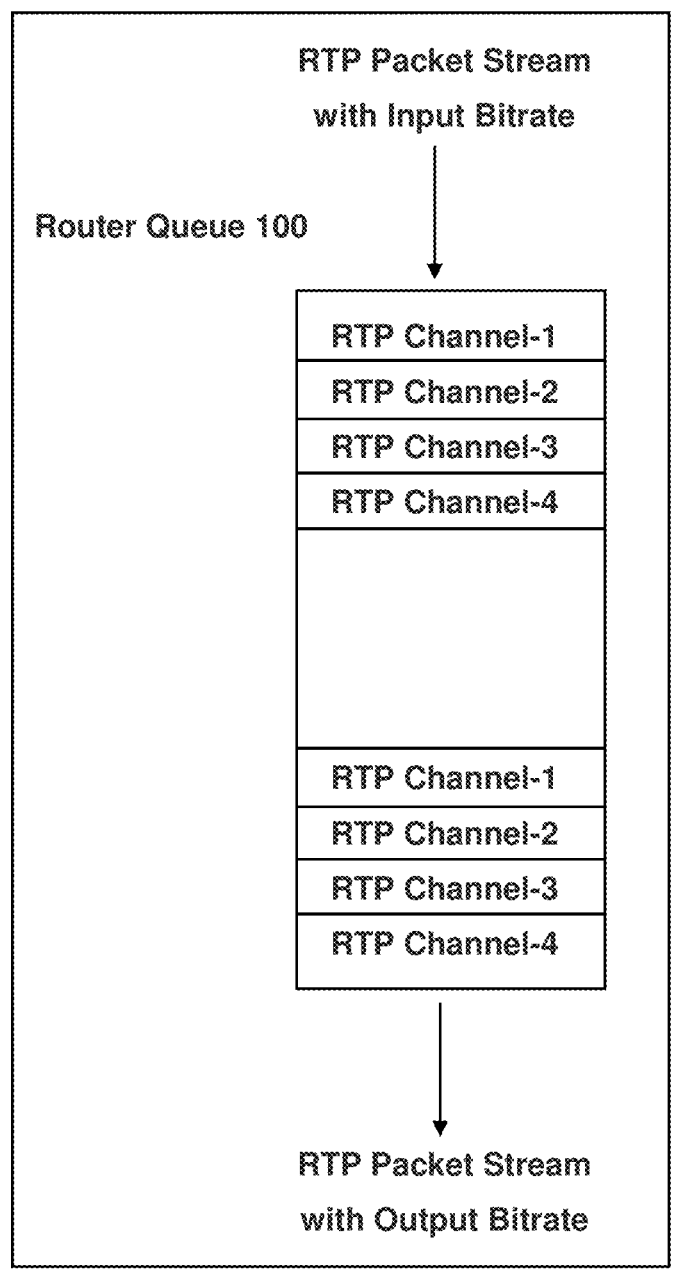
FIG. 1 is a schematic diagram of a conventional router queue of a conventional VoIP router.

The Applicants have realized that conventional VoIP devices and conventional network elements, particularly those that utilize RTP communications or that need to transmit or relay RTP packets, perform the transmitting or the relaying of RTP packets on an immediate basis, without adding an intentional delay or lag or latency. The Applicants have realized that conventional devices and systems do so as an attempt to ensure that the transport of packets is done in "real time" as much as possible.

However, the Applicants have realized that in a counter-intuitive manner and even in a surprising manner, intentional or pre-planned or selective injecting or adding or inserting of a delay period, prior to transmitting and/or relaying of an RTP packet, may actually improve the Quality of Service (QoS) and/or the Quality of Experience (QoE) of a particular user and/or of a particular VoIP call and/or of a group or batch of users or VoIP calls.

The Applicants have realized that multiple VoIP calls or VoIP sessions, that are performed simultaneously and/or at least partially concurrently by multiple users or devices, may cause a non-desired network congestion that, in turn, may cause one or more (or some) of the VoIP calls to experience a high level of packet drop, packet loss, error rate, erroneous packets, or other imperfections that degrade the QoS or QoE of such VoIP calls.

The Applicants have realized that it may be beneficial to intentionally and/or selectively add or insert a delay period, in which an outgoing transmission (or relaying) of an RTP packet is slightly delayed and not immediately performed, by one or more relevant devices (e.g., an end-user device; a VoIP terminal or end-user device; a gateway; an IP phone; a Session Border Controller (SBC); a network switch; a VoIP endpoint device; a VoIP network element or non-endpoint device; a VoIP relay node or relay element; or the like); for example, a non-transmission delay having a random or pseudo-random time-length, in the range of 0 to K milliseconds, wherein K indicates the time-length of voice that is represented in the RTP packet that is about to be transmitted or relayed (e.g., K=20 milliseconds), or wherein K indicates the base frame length of an RTP packet of the VoIP channel whose RTP packets are being re-ordered or whose RTP packets are being subjected to the injected waiting-period prior to transmission; wherein K may be the time-frame of a single RTP packet, or of multiple-payload RTP packet if multiple-payload RTP transmission is utilized.

The Applicants have realized that in accordance with the present invention, such novel and counter-intuitive insertion of intentional delay or intentional non-transmission/non-relaying random-length time-period, prior to the actual transmission or relaying of an RTP packet, may actually increase or improve the QoS or QoE or other quality indicators of a particular VoIP call or of a group or set or subset of at least one of (or, at least some of) the VoIP calls (e.g., a group of VoIP calls that are outgoing from, or that pass through or relayed through, a particular SBC or a particular gateway or a particular network switch), and/or may reduce or decrease packet error rate, lost packets, erroneous packets, or other imperfections, in at least one (or, in at least some) of the VoIP calls or VoIP channels; as such utilization of randomized pre-transmission delay-period may reduce the variance of the voice quality across the multiple VoIP channels, and/or may increase the voice quality of at least some of the VoIP calls (e.g., at least the voice quality of the VoIP channel that would otherwise have the worst or the lowest voice quality). This may further lead to other direct or indirect benefits or advantages; for example, enabling a particular VoIP user or caller to maintain his ongoing VoIP call, rather than deciding to terminate his VoIP call due to poor or unacceptable voice quality.

Accordingly, embodiments of the present invention comprise an RTP packet transition equipment or device (e.g., VoIP client, Gateway, IP Phone, SBC, network switch, or the like) that transmits or relays RTP packets in accordance with a timing scheme such that a random or pseudo-random time-delay is waited by the equipment or the device prior to transmitting or relaying an RTP packet; or that transmits or relays RTP packets by utilizing an RTP transmission queue, which receives RTP packets from multiple VoIP channels at a first order of VoIP channels, but outputs or transmits those RTP packets at a second, different, order of VoIP channels, or at a mixed order or a re-organized order or a shuffled order or an interleaved order of VoIP channels. It is noted that the re-ordering or mixing or re-organizing of RTP packets is performed only relative to VoIP channels; such that, for example, the packets of VoIP channels 1 and 2 and 3 arrive into an RTP transmission buffer at that order (1 then 2 then 3), but the RTP packets leave the RTP transmission buffer in a new, mixed, order of VoIP channels, such as 3 then 1 then 2; wherein the RTP packets within each VoIP channel remain (or, are maintained) non-mixed and in their original order.

In a demonstrative embodiment, each RTP packet carries a payload that corresponds to N milliseconds (e.g., N=20) of time-length of voice (e.g., audio, speech); or, the time frame of each RTP packet in a VoIP channel is 20 milliseconds (or, is an integer multiple of 20 milliseconds). Instead of transmitting or relaying an RTP packet every N milliseconds, the VoIP equipment or device operates to intentionally delay the transmission or the relaying of each such RTP packet, for a random or pseudo-random delay period denoted Delta. The value of Delta may be, for example, a random or pseudo-random number in the range of 0 to N. In some embodiments, across multiple or many RTP packets that are transmitted or relayed, the value of Delta may be generally evenly distributed in that range of 0 to N.

In some embodiments, the higher threshold of the range need not be N; but rather, may be for example, N/2, or 0.75 N, or 0.80 N, or 0.90 N, or 1.1 N, or 1.25 N, or may be M times N (wherein M is a positive integer), or other suitable threshold value which may be pre-determined or pre-configured.

In some embodiments, the lower threshold of the range need not be 0; but rather, may be for example, 1 millisecond, or 2 milliseconds, or 0.5 millisecond, or N/10 milliseconds, or N/20 milliseconds, or other suitable threshold value which may be pre-determined or pre-configured.

In some embodiments, the particular pre-transmission delay-period or waiting-period prior to transmitting or relaying of an RTP packet, may be pseudo-randomly or randomly selected within the above-mentioned range. In other embodiments, the delay-periods for multiple RTP packets, may be evenly distributed or generally-evenly distributed among the multiple RTP packets of multiple VoIP calls (or VoIP channels); such that, for example, RTP packet number 1 which belongs to VoIP channel number 1 would wait a delay-period of 1 millisecond; RTP packet number 2 which belongs to VoIP channel number 2 would wait a delay-period of 2 milliseconds; RTP packet number 3 which belongs to VoIP channel number 3 would wait a delay-period of 3 milliseconds; and so forth, until RTP packet number 19 which belongs to VoIP channel number 19 would wait a delay period of 19 milliseconds, then RTP packet number 20 which belongs to VoIP channel number 20 would wait a delay-period of 0 milliseconds, then RTP packet number 21 which belongs to VoIP channel number 21 would wait a delay period of 1 milliseconds, then RTP packet number 22 which belongs to VoIP channel 22 would wait a delay-period of 2 milliseconds, and so forth. Accordingly, the randomized pre-transmission delay-period is distributed evenly across multiple VoIP channels; and within each VoIP channel the RTP packets maintain their original order (e.g., outputted in the same order as they arrived, or as they were generated).

In some embodiments, the pre-transmission waiting period is implemented and enforced such that every VoIP channel would not be repeatedly subjected to the same value of pre-transmission waiting-period again and again; for example, such that a first RTP packet that arrived to the RTP transmission queue from VoIP channel number 1, would wait (for example) 5 milliseconds prior to being transmitted out, whereas the RTP packet that arrived to the RTP transmission queue from VoIP channel number 2 would wait (for example) 18 milliseconds prior to being transmitted out. For example, an RTP packet that arrived to the RTP transmission queue from VoIP channel number 3, may be subject to a waiting period of (for example) 13 milliseconds, such that it would exit the RTP transmission queue between the two exits of the two RTP packets of VoIP channel number 1 and 2; thereby achieving a mixed order of exit of RTP packets, relative to the entry order, across multiple VoIP channels.

In some embodiments, the waiting period (or delay period, or back-off period, or hold-back period, or no-RTP-transmission period) for (or prior to) RTP packet transmission may be a distributed pseudo-random number in the range of 0 to N, wherein N indicates the RTP packet duration or the RTP base frame time-length. Other suitable schemes may be used to ensure generally-even distribution of pseudo-random pre-transmission delay periods prior to RTP packet transmissions across different VoIP channels.

In some embodiments, as a result of such intentional pseudo-random length of delay-period prior to transmission or relaying of RTP packets, or as a result of another suitable mechanism that re-orders or mixes or shuffles the order of RTP packets in an RTP transmission queue across different VoIP channels, the order of queued RTP packets of various VoIP transmission channel, such as in a transmission queue within a particular VoIP router or gateway or SBC or network switch, may continuously change across VoIP channels; and there is a low chance that a particular VoIP transmission channel will suffer packet loss or packet error rate at rates that are higher than those introduced due to overuse of the VoIP router (or other VoIP device).

Embodiments of the present invention may operate in conjunction with a VoIP network or VoIP system, which may comprise one or more routers, network switches, gateways, SBC units, end-user devices, IP phone devices, and/or other network elements. Such network or system may serve a large amount of VoIP calls, and may optionally serve large amounts of non-VoIP data traffic.

The Applicants have realized that if the amount of traffic that is transmitted or relayed, exceeds the capability of the router (or other relevant network element), and/or if such traffic exceeds a policy enforced by such router or other relevant network element (e.g., a bandwidth limiting policy), then VoIP traffic may suffer packet loss, dropped packets, lost packets, erroneous packets, jitter, jittery performance, and/or other imperfections.

The Applicants have further realized that such VoIP packet loss or other VoIP packet errors, are typically not distributed evenly across multiple VoIP calls. Rather, as realized by the Applicants, some VoIP calls suffer a higher rate of packet loss; whereas other VoIP calls may not suffer packet loss at all or may suffer only a small rate of packet loss. Accordingly, one or more, or a few, VoIP channels may suffer a burst of packet loss, in which a set of several consecutive RTP packets of the same channel are lost and are not properly delivered to the recipient. Since VoIP equipment is typically not designed to handle high rate of packet loss or packet loss burst, the result is that some VoIP call users experience adequate call quality, whereas some other VoIP call users experience poor or degraded call quality.

The Applicants have realized that a vendor or a provider of VoIP telephony services or equipment, may provide and/or utilize equipment that may partially mitigate voice quality issues, such as by using Forward Error Correction (FEC), packet redundancy, or advance coders that may be more robust against packet loss. However, due to the packet loss variance, it is difficult to predict or to estimate in advance the maximum packet loss that a particular VoIP channel or VoIP call will experience; and the vendor or service provider may not be able to guaranty a minimum quality level of voice quality for all VoIP calls or for a particular VoIP call.

In contrast, embodiments of the present invention comprise a method of RTP packets transmission; such that during VoIP calls, and particularly during a VoIP network overuse or congestion, the method increases the probability that packet loss would be distributed generally evenly across multiple or many VoIP calls, in a manner that does not significantly degrade the quality or the QoS or the QoE of any particular VoIP call.

Reference is made to FIG. 1, which is a schematic diagram of a conventional router queue 100 of a conventional VoIP router, which performs routing of RTP packets of multiple VoIP channels or multiple VoIP calls. As shown at the top, a stream of RTP packets enters the router queue at a first rate having an Input Bitrate. As shown at the bottom, a stream of RTP packets exits the router queue at a second rate having an Output Bitrate. The RTP packets maintain a fixed order or a same order within the router queue; such that, for example, an RTP packet of RTP Channel-2 always arrives after an RTP packet of RTP Channel-3 and before an RTP packet of RTP Channel-1. If the Input Bitrate is greater than the Output Bitrate, then a Router Overuse exists; the router queue becomes full; and the router drops RTP packets, which are non-delivered to their destination. Typically, all the RTP channels share the same packet size (e.g., in bytes) and share the same packet time (e.g., the time-length of audio, in milliseconds, that each RTP packet represents); and the RTP packets arrive to their destinations in the same order as they entered, except for the lost or dropped or non-delivered RTP packets.

The Applicants have realized that in a conventional system, two different scenarios may exist and may be addressed in order to improve quality of VoIP calls.

In a first scenario identified by the Applicants, all the RTP channels arrive to the VoIP router at evenly distributed time-pointes. For example, if packet time of an RTP packet is 20 milliseconds, and the VoIP router servers 100 channels, then every 0.2 millisecond an RTP packet enters the VoIP router. In a demonstrative example, the Output Bitrate is 25 percent smaller than the Input Bitrate; and therefore, every fourth RTP packet will be dropped by the VoIP router and will not be delivered to its destination. Since there are 100 channels in this example, a particular group of 25 particular channels will repeatedly suffer 100 percent of packet loss (namely, the conventional VoIP router will drop 100 percent of the RTP packets of 25 particular channels out of the 100 channels); whereas, the other 75 particular channels will not suffer any RTP packet loss. The Applicants have realized that the average packet loss ratio may be denoted as $1/L$, which may be equal to $(1-(\text{Output-Bitrate}/\text{Input-Bitrate}))$; whereas every $L$ packets (RTP packets), a single RTP packet is dropped by the VoIP router. Let C denote the number of Channels that are served by the VoIP router. If the value of $C/L$ is an integer (e.g., 3 or 4 or 7), or is close to an integer (e.g., 3.05, or 8.1), then RTP packets from the same particular channels will repeatedly be dropped by the VoIP router; and those particular channels will experience a significant error rate or dropped-packets rate, which may even be 100 percent of dropped or lost RTP packets.

In a second scenario identified by the Applicants, not all the VoIP channels arrive to the VoIP router at evenly distributed time-points; or, VoIP channels are not evenly distributed over time. Rather, there are time-periods in which a burst of RTP packets arrive into the VoIP router; and there are other time-periods in which zero RTP packets, or very few RTP packets, arrive into the VoIP router. In a demonstrative example, the RTP packet time or the RTP frame time is 20 milliseconds; the VoIP router serves 100 channels; 50 of those channels have RTP packets that arrive to the VoIP router within the same two (2) milliseconds; whereas, the other 50 channels have RTP packets that arrive to the VoIP router within the other 18 milliseconds. If the Output Bitrate is smaller than the Input Bitrate, then the router queue becomes full; and RTP packets that were received from the 50 channels that arrived during the same 2 milliseconds will likely suffer higher packet loss rate, relative to the packet loss rate that would be experienced by the other 50 channels (that arrived during the other 18 milliseconds). Typically, the RTP packets of a burst, that arrive the last to the VoIP router, are more likely be dropped.

Figure 2:
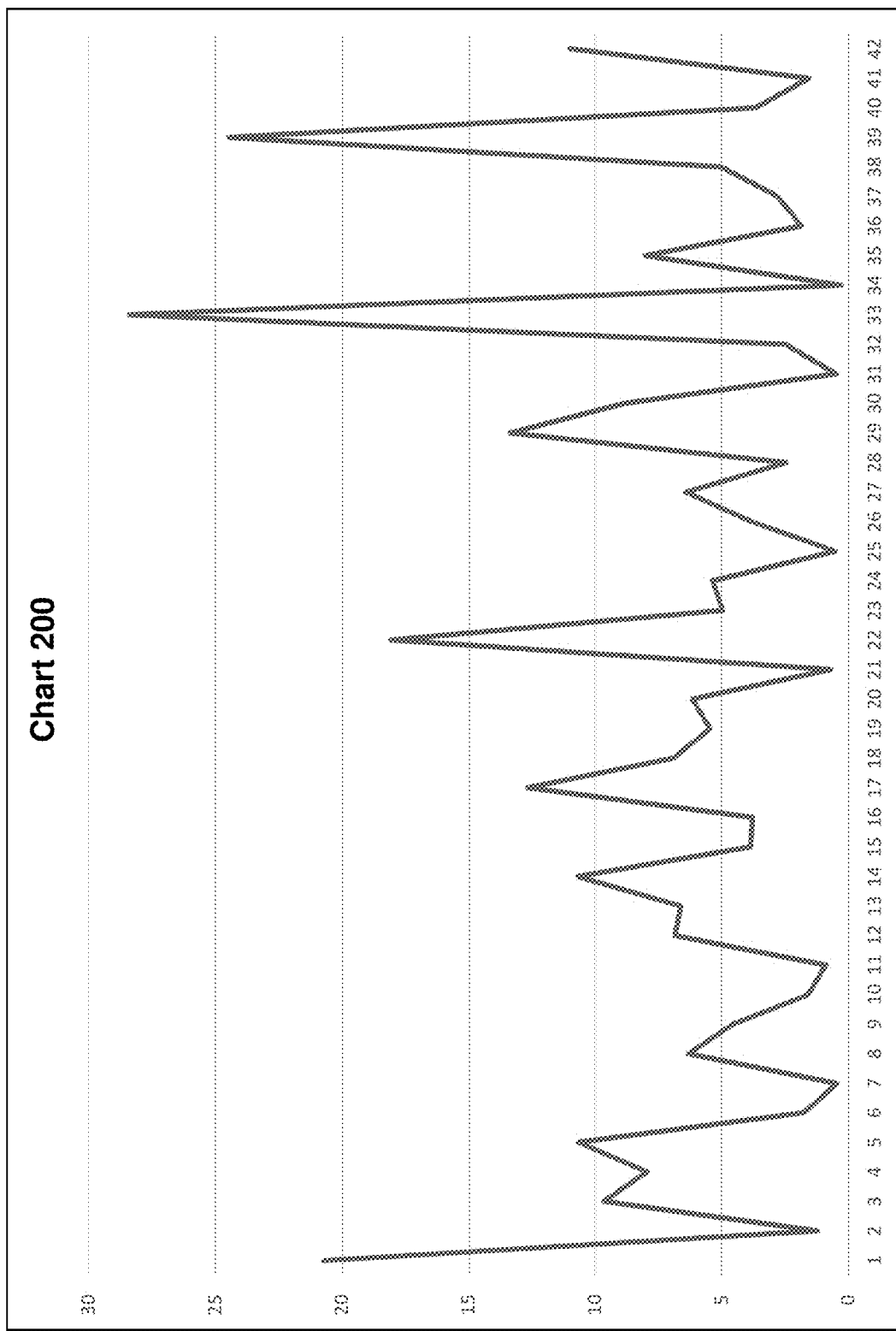
FIG. 2 is a schematic illustration of a chart demonstrating packet loss in VoIP calls, that some embodiments of the present invention may mitigate or reduce.

Reference is made to FIG. 2, which is a schematic illustration of a chart 200 demonstrating packet loss in VoIP calls, that some embodiments of the present invention may mitigate or reduce. In a demonstrative example, 42 (forty two) VoIP calls were placed, using a conventional VoIP router. The horizontal axis indicates the running number of the VoIP call being analyzed, call number 1 to call number 42. The vertical axis indicates the percentage of RTP packets that were lost in that particular VoIP call.

Across those 42 monitored VoIP calls, on average, 6.7 percent of the RTP packets were lost. This value by itself might appear as tolerable; however, the variance of the data is very high: some VoIP calls experienced 0 percent of RTP packet loss, whereas some other VoIP calls experienced 28 or 24 or 21 percent of RTP packet loss, which is inadequate.

The Applicants have realized that even though the order of the RTP channels may sometimes change by itself, as new VoIP calls are initiated and added to the queue, old calls disconnect or end or are otherwise terminated, and some none-RTP packets may be inserted into the queue (e.g., RTP Control Protocol (RTCP) packets); still, some particular VoIP channels continued to suffer a significant rate of RTP packet loss (e.g., over 20 percent of RTP packet loss) during the entirety of the VoIP call or during a particular time-segment in the VoIP call (e.g., during a 30-second or 60-second time-segment, or during a significant or substantial portion of the VoIP call), which causes poor QoS or poor QoE for such VoIP call; and some embodiments of the present invention may mitigate such problems.

In accordance with the present invention, a device or a network element (e.g., end-user device, IP phone, Internet-connect phone, SBC, gateway, VoIP router, VoIP switch, network switch, VoIP hub, VoIP gateway, VoIP server, or the like), which needs to transmit or relay or transport or output an RTP packet, would intentionally wait a pre-transmission time-period (or waiting-period, or delay period) denoted Delta prior to transmitting that RTP packet of that VoIP channel; and during that waiting-period, would not transmit the RTP packet that is intended to be transmitted next (and in some embodiments, would not transmit any other RTP packet(s) that is or are waiting to be transmitted or relayed; whereas, in other embodiments, it may transmit other RTP packet(s) that belong to a different VoIP channel). The time-length of the waiting-period (Delta) may be a random or pseudo-random number of milliseconds, in the range of 0 to N, wherein N is the time-length or the frame-time of that RTP packet that is waiting to be transmitted or relayed (or, wherein N is a pre-defined or pre-configured or hard-coded value, such as, in some embodiments, 20 milliseconds, or the typical RTP frame length of that VoIP channel).

Figure 3:
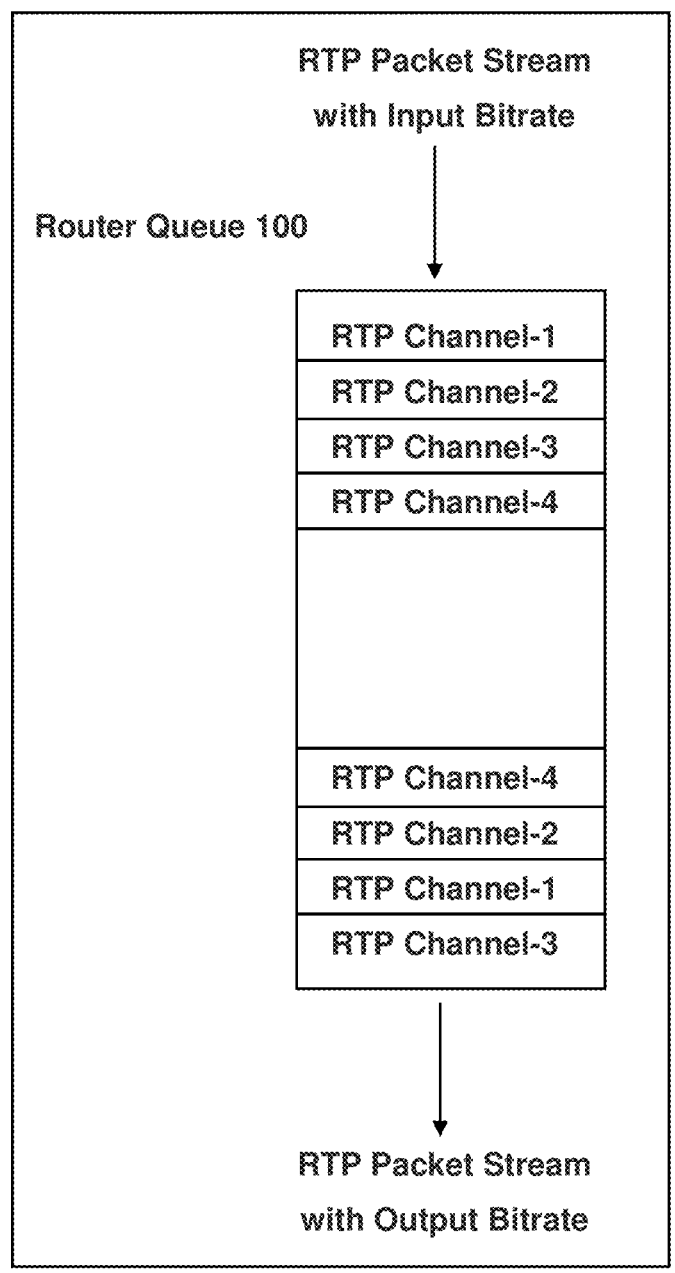
FIG. 3 is a schematic diagram of a router queue of a VoIP router, which performs routing of RTP packets of multiple VoIP channels or multiple VoIP calls, in accordance with some demonstrative embodiments of the present invention.

Reference is made to FIG. 3, which is a schematic diagram of a router queue 300 of a VoIP router, which performs routing of RTP packets of multiple VoIP channels or multiple VoIP calls, in accordance with some demonstrative embodiments of the present invention. As shown at the top, a stream of RTP packets enters the router queue at a first rate having an Input Bitrate. As shown at the bottom, a stream of RTP packets exits the router queue at a second rate having an Output Bitrate. However, the VoIP router waits a pseudo-random waiting-period prior to transmitting or relaying or outputting each RTP packet. Due to the pseudo-random delay period or waiting period within the VoIP router, the RTP packets of different VoIP channels do not maintain a fixed order or a same order within the router queue (but, the RTP packets of each VoIP channel maintain their original order); such that, for example, an RTP packet of RTP Channel-2 does not always exit the queue after an RTP packet of RTP Channel-3 and before an RTP packet of RTP Channel-1. In some embodiments, the re-ordering or shuffling or mixing of the RTP packets within the transmission queue, may be performed by adding a random or pseudo-random pre-transmission waiting period prior to RTP packet transmission; and/or by using other mechanisms, for example, an RTP packet reordering unit or shuffling unit or mixing unit or interleaving unit or re-organizing unit, which may operate on the order of VoIP channels in the RTP packet queue, to mix or shuffle or re-order or re-organize the order of RTP packets of different VoIP channels that are stored for transmission in that RTP packet transmission queue (but while maintaining the original non-mixed non-modified order of RTP packets within each VoIP channel in the queue).

If the Input Bitrate is greater than the Output Bitrate, then a VoIP Router Overuse (or VoIP network overuse, or VoIP link overuse, or VoIP device overuse) exists; the VoIP router queue becomes full; and the VoIP router drops RTP packets, which are non-delivered to their destination. Due to the pseudo-random manner in which RTP packets are due for being outputted in RTP transmission queue of the VoIP router, when an RTP packet needs to be dropped due to Router Overuse, the dropped RTP packet belongs pseudo-randomly to one of many VoIP channels (or VoIP calls) being served by that VoIP router; such that not a particular VoIP channel, and not a particular VoIP call or caller, repeatedly suffers from RTP packet loss (packet drop) while other VoIP channels or VoIP calls are repeatedly non-affected.

Accordingly, each one of the VoIP channels or VoIP calls that are served, is expected to occasionally suffer RTP packet loss percentage that is proximate to the average RTP packet loss rate across all the served VoIP channels; without significant variance among VoIP calls or callers or channels. Using the demonstrative example of FIG. 2, but this time using the VoIP router 300 of the present invention, in some embodiments of the present invention, each one of the 42 different VoIP calls is expected to experience an average RTP packet loss rate of approximately 6.7 percent (e.g., approximately 5 or 6 or 7 or 8 or 9 percent); and none of the 42 different VoIP calls is expected to experience an average RTP packet loss rate of 28 or 24 or 21 percent (which was measured when a conventional VoIP router was utilized).

Accordingly, in a VoIP communication system (or VoIP router or SBC or gateway or network switch), that serves or comprises many or numerous VoIP calls (e.g., at least 20 or 50 such VoIP calls), the method of the present invention may be applied to each one of the VoIP calls or VoIP channels being served; and during VoIP network overuse or VoIP router overuse, the RTP packets from all the served VoIP channels would be evenly or generally-evenly distributed over the RTP packet time or the RTP frame time, and no particular VoIP channel (or, no particular VoIP call) would suffer repeated RTP packet loss at a rate that is two or three times greater than the RTP packet loss rate of another VoIP call being served by the same VoIP router or equipment, as RTP packet loss would be generally evenly distributed across all the served VoIP channels and VoIP calls. Embodiments of the present invention may thus significantly increase the number and/or the percentage of VoIP channels (or VoIP calls) that experience good or excellent voice quality; and may even enable a VoIP equipment vendor or a VoIP service to guarantee a maximum RTP packet error rate per any VoIP call.

In some embodiments, the system or the network may comprise multiple network elements which may be of different types, such as, wired and/or wireless routers, network switches, hubs, gateways, relay nodes, SBC units, or the like; which may utilize one or more mediums (e.g., wireless, public Internet, organizational intranet, LAN, W-LAN, wide area network (WAN), wired links, wireless links); and accordingly, RTP packets may be transferred or transported or relayed through several such network elements and/or mediums. A network element overuse may be experienced at any one (or more) of such network elements or network participants or network nodes; and therefore, one or more, or some, or all, of the VoIP network elements may implement the randomized-delay mechanism for transporting or transmitting or relaying RTP packets.

In some embodiments, even the initiating end-user device (e.g., being utilized directly by the end-user that places or initiates or commences the VoIP call, such as a VoIP telephone device or an Internet-connected phone device, or a "soft" client such as a VoIP application running on a computer or a smartphone or a tablet or other electronic device) may locally implement the randomized-delay mechanism for transmitting of its RTP packets, as this by itself may improve the RTP packet loss distribution across multiple VoIP channels regardless of the particular location of the overused network equipment or network node.

In some embodiments, the randomized-delay mechanism may be implemented immediately before (or at) an entry port or entry node of a network equipment; or may even be implemented as a stand-alone Randomized-Delay Network Element which may be located between any two suitable network elements and may relay RTP packets while adding a randomized delay prior to relaying each RTP packet. In some embodiments, the randomized-delay mechanism for RTP packet transmission may be implemented by using hardware components and/or software components, in or near (e.g., connected to) the equipment that is utilized for RTP packet transmission or relaying (e.g., IP phone, VoIP router, VoIP switch, PSTN to VoIP gateway, VoIP server, soft client, or the like); or may be implemented by using an external equipment or stand-alone unit which may be inserted or added or connected between two network nodes or two network points, and such external unit may deploy the randomized pre-transmission delay mechanism in relaying of RTP packets, either as a single or sole functionality of such external unit, or as one functionality out of multiple functionalities that it may perform.

The randomized delay mechanism may be utilized in combination with, or in conjunction with, other suitable methods for mitigating packet loss, such as, FEC, packet redundancy, and advance coders that are more resilient to packet loss. In some embodiments, optionally, and only in a non-endpoint device (e.g., SBC, router, gateway, network switch), even though the unit or mechanism is referred to as a "randomized delay" mechanism or unit, such mechanism or unit may operate not necessarily by directly adding a pre-transmission random delay period, but rather, may optionally operate by mixing or re-ordering or shuffling the order of RTP packets that are buffered for transmission in an RTP packet transmission queue across multiple VoIP channels, thereby causing indirectly a delay or a random delay in the transmission of RTP packets relative to the original VoIP channel order in which they have arrived into the RTP transmission queue.

In some embodiments, a "VoIP endpoint device" may be, for example, a VoIP phone device, a VoIP phone terminal, an Internet-connected phone, a Wi-Fi phone, an Internet Protocol (IP) phone, an electronic device or computing device (e.g., laptop computer, desktop computer, smartphone, tablet, smart-watch) having a VoIP unit, and/or other end-user device able to place or initiate VoIP calls, or able to receive VoIP calls; and typically comprising, or being associated with, an acoustic microphone to capture audio or voice or speech or utterances of a human speaker, and to generate from the captured audio the suitable VoIP data, particularly as RTP packets which are buffered locally and then transmitted out towards the VoIP call recipient. In some embodiments, a "VoIP endpoint device" comprises an acoustic microphone, as well as an RTP packets generator to generate the suitable RTP packets from the locally-captured audio.

In some embodiments, a "VoIP endpoint device" is capable of maintaining not more than a single VoIP call and/or a single VoIP channel at any specific time. In other embodiments, a VoIP gateway may be regarded also as a VoIP endpoint device or as a hybrid VoIP device (e.g., able to generate RTP packets and/or to relay externally-generated RTP packets), as it may be able to receive digital representation of audio that was captured by one or more other VoIP endpoints and was already converted from captured audio to digital data; and the VoIP gateway may further convert or re-format or encapsulate such digital audio data into RTP packets or into other suitable VoIP format for further transport of the VoIP payload towards a recipient.

In some embodiments, a "non-endpoint VoIP device" or a "VoIP network element" may include, for example, other network elements (e.g., router, network switch, SBC, proxy server, relay unit, or the like), that typically do not have an acoustic microphone and/or typically do not generate new RTP packets from locally-captured audio, but rather, they relay or route or transmit one or more RTP packets or other VoIP payload that is incoming to such unit from one or more VoIP caller or VoIP channels, to one or more VoIP recipients or destinations. In some implementations, the term "VoIP network element" may comprise multiple types of devices, such as, a VoIP endpoint (e.g., Internet-connected phone), a VoIP routing unit (e.g., SBC or router), a hybrid device (e.g., a VoIP gateway), or the like.

Figure 4:
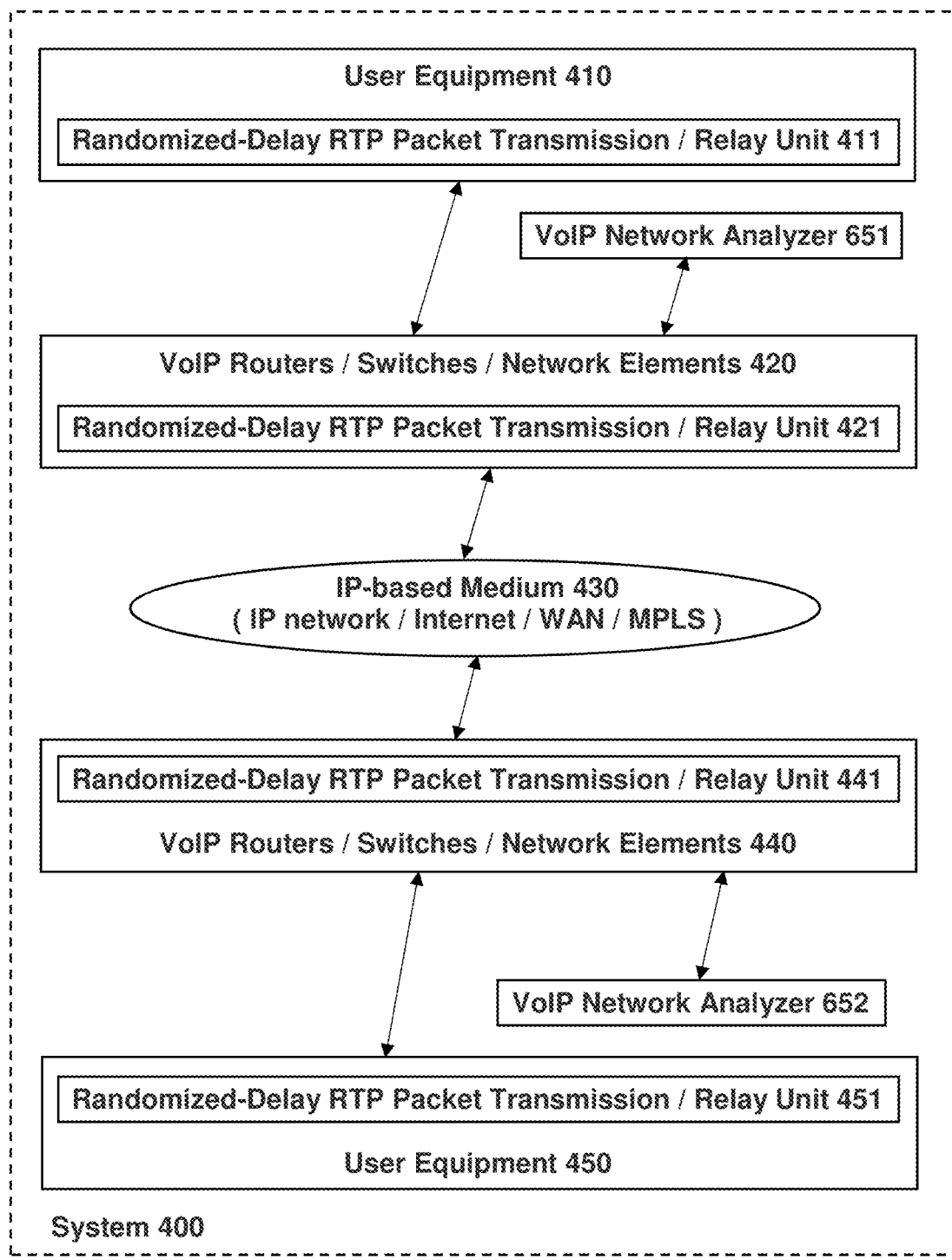
FIG. 4 is a schematic block-diagram illustration of a system, in accordance with some demonstrative embodiments of the present invention.

Reference is made to FIG. 4, which is a schematic block-diagram illustration of a system 400, in accordance with some demonstrative embodiments of the present invention. System 400 may enable a VoIP call between a first user that utilizes a User Equipment 410, and a second user that utilizes a User Equipment 450.

The User Equipment (410, 450) may be, for example, an IP phone device or an IP phone terminal, an Internet-connected phone, a "soft client" or an IP "soft" client device (e.g., a desktop computer or a laptop computer running a VoIP application and equipped with audio microphone and audio speaker), a VoIP phone, a VoIP-capable device or terminal, a Session Initiation Protocol (SIP) phone, a Wi-Fi cordless phone, a Wi-Fi/Cellular (dual mode) phone, a smartphone or a cellular phone having a Wi-Fi transceiver, a VoIP trunk, a SIP trunk, or other suitable VoIP end-user device.

User Equipment 410 communicates over a wired link and/or a wireless link with one or more VoIP routers/switches/network elements 420; which communicate over an IP-based medium 430 with one or more other VoIP routers/switches/network elements 440, which in turn communicate over a wired link and/or a wireless link with User Equipment 450.

The VoIP routers/switches/network elements (420, 440) may comprise one or more network elements, switches, routers, gateways, SBC units, IP telephone servers, VoIP servers, or the like.

The IP-based medium 430 may be or may comprise, for example, an IP network, the public Internet, an organizational Intranet or a local IP network, a Local Area Network (LAN) or a Wireless LAN (W-LAN), a wide area network (WAN), a dedicated fiber-optics line or connection, a shared or shared-access fiber-optics line or connection, DSL or ADSL or xDSL connection or line, frame relay network, Multi-Protocol Label Switching (MPLS) network, a dedicated or shared connection between two locations or between two branches of an organization or between two gateways, a dedicated or shared connection between a home-based device and an organization or enterprise device or server, a connection utilized by a service provider (e.g., Internet Service Provider (ISP), VoIP service provider, IP telephony service provider), or the like.

In accordance with the present invention, User Equipment 410 may comprise a Randomized-Delay RTP Packet Transmission/Relay Unit 411. Additionally or alternatively, User Equipment 450 may comprise a Randomized-Delay RTP Packet Transmission/Relay Unit 451. Additionally or alternatively, a particular network element out of VoIP routers/switches/network elements 420 may comprise a Randomized-Delay RTP Packet Transmission/Relay Unit 421. Additionally or alternatively, a particular network element out of VoIP routers/switches/network elements 440 may comprise a Randomized-Delay RTP Packet Transmission/Relay Unit 441. Additionally or alternatively, a Randomized-Delay RTP Packet Transmission/Relay Unit may be installed or connected between two members of the group of routers/switches/network elements 420. Additionally or alternatively, a Randomized-Delay RTP Packet Transmission/Relay Unit may be installed or connected between two members of the group of routers/switches/network elements 440. Additionally or alternatively, a Randomized-Delay RTP Packet Transmission/Relay Unit may be installed or connected between (i) User Equipment 410, and a member of the group of routers/switches/network elements 420. Additionally or alternatively, a Randomized-Delay RTP Packet Transmission/Relay Unit may be installed or connected between (i) User Equipment 450, and a member of the group of routers/switches/network elements 440. Each one of the above-mentioned Randomized-Delay RTP Packet Transmission/Relay Units may operate, for example, by adding a pre-transmission delay period or waiting period prior to transmission of RTP packets; and/or by mixing or shuffling or re-ordering the RTP packets within an RTP transmission queue or buffer across multiple VoIP channels, such that the RTP packets enter the RTP transmission queue at a first VoIP channel order but exit the RTP transmission queue at a second, different (shuffled, mixed, re-organized, modified) VoIP channel order.

Figure 5:
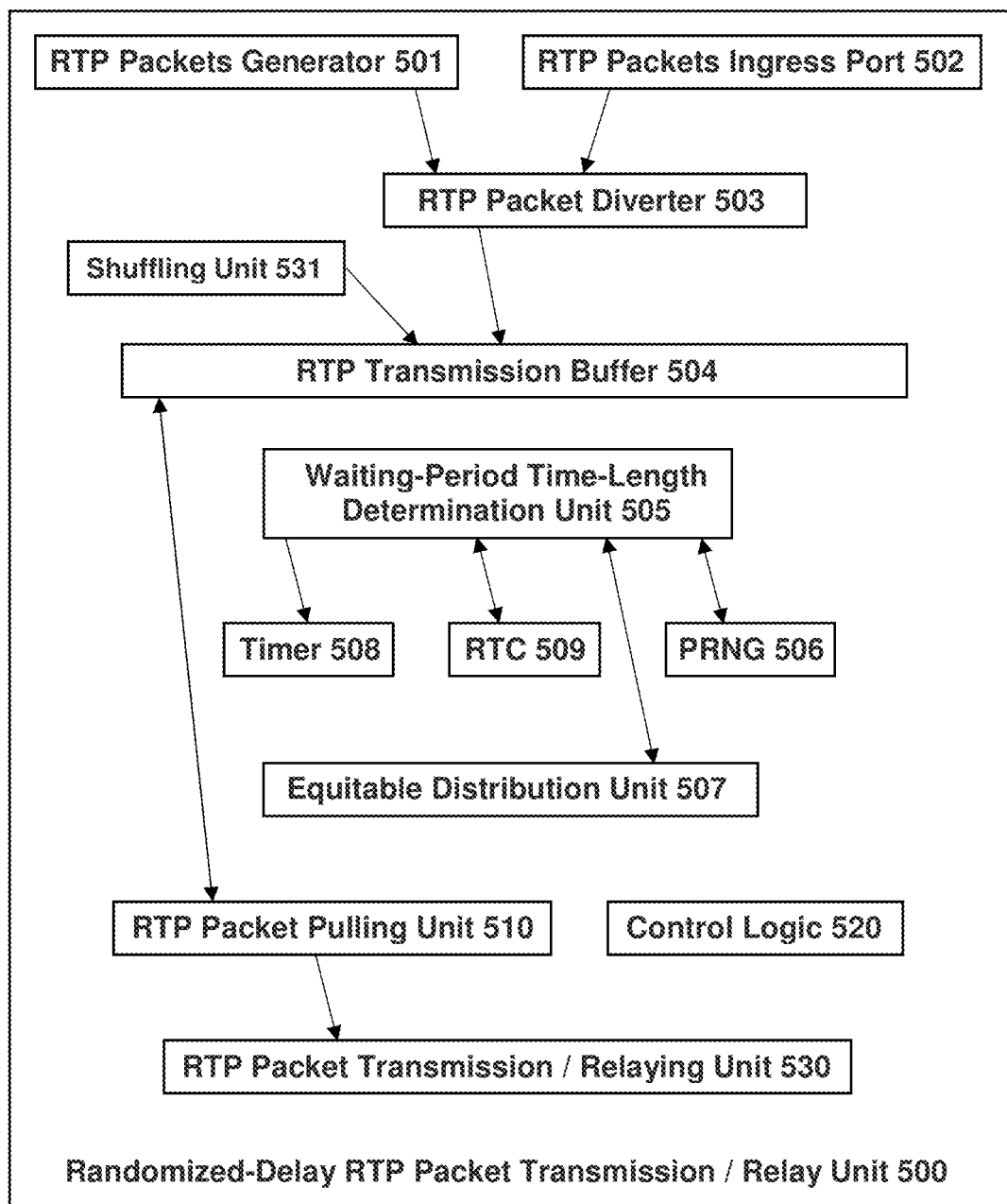
FIG. 5 is a schematic block-diagram illustration of a randomized-delay RTP packet transmission/relay unit, in accordance with some demonstrative embodiments of the present invention.

Reference is made to FIG. 5, which is a schematic block-diagram illustration of a Randomized-Delay RTP Packet Transmission/Relay Unit 500, in accordance with some demonstrative embodiments of the present invention. Randomized-Delay RTP Packet Transmission/Relay Unit 500 may be a demonstrative example of any of the Randomized-Delay RTP Packet Transmission/Relay Unit(s) mentioned above with reference to FIG. 4, and/or may be a demonstrative example for a unit able to perform some or all of the operations discussed above and/or herein.

For example, an RTP packet may be intended for transmission or for outputting or for relaying outwardly from the Randomized-Delay RTP Packet Transmission/Relay Unit 500. The RTP packet may originate from a co-located RTP packet generator 501, for example, which may be part of a unit that captures audio (e.g., speech or voice uttered by the user) and converts it into digital packet(s) including the RTP packet for the purpose of VoIP transmission. Alternatively, the RTP packet may originate from a remote or separate source or device, and may be incoming into the Randomized-Delay RTP Packet Transmission/Relay Unit 500 via an RTP ingress port 502 which may receive RTP packets for the purpose of transmitting them or relaying them to their final destination and/or towards a network element that would further relay them towards their final destination.

Instead of immediately and/or directly forwarding the RTP packet to an RTP packet transmission/relaying unit 530 that transmits or relays or outputs the RTP packet towards its destination, an RTP packet diverter 503 diverts the incoming or the generated RTP packet towards an RTP transmission buffer 504, implemented via a memory unit or storage unit or register(s) or other buffering mechanism(s), for short-term storage of the RTP packet. A waiting-period time-length determination unit 505 determines a time-length that would be waited (e.g., without transmission of the RTP packet) prior to actual transmission of the RTP packet. The determination may be performed, for example, by using a random-number generator (RNG) or a pseudo-random number generator (PRNG) 506, which may determine a pseudo-random number of milliseconds to be waited for this particular VoIP channel prior to the transmission of the RTP packet, within a pre-defined range (e.g., from 0 to N milliseconds; wherein N is, for example, a time-length of a voice payload that is carried by the RTP packet, such as 20 milliseconds, or an RTP base frame time). Optionally, an Equitable Distribution Unit 507 may operate to keep track of the lengths of waiting periods that were allocated to each RTP packet of each VoIP channel, and to ensure that, for example, in a set of N consecutive RTP packets, each RTP packet of a different VoIP channel is allocated a particular unique pre-transmission waiting-period or a delay-period that is in the range of 0 to (N−1), or by otherwise tracking and enforcing uniqueness or differentiation of the pre-transmission waiting period across different VoIP channels.

A timer 508 may operate to measure the time that elapses since the determination of the time-length of the waiting-period of a particular RTP packet of a particular VoIP channel; optionally in conjunction with a Real-Time Clock (RTC) 509, or other mechanism able to track the passage of time (e.g., a counter that is incremented every 1 cycle or every M processing cycles of a processor whose processing cycle speed is known or is pre-defined). Upon ending of the allocated waiting-period, the timer 508 outputs a triggering signal which triggers an RTP packet pulling unit 510 to pull the RTP packet from the RTP transmission buffer 504, and forwards the RTP packet to the RTP packet transmission/relaying unit 530, which immediately transmits or relays or outputs the RTP packet outwardly from the Randomized-Delay RTP Packet Transmission/Relay Unit 500, towards its final destination or towards another network element that would further transport the RTP packet towards its final destination.

In some embodiments, instead of (or in addition to) utilizing the above-described units that directly inject or add a random pre-transmission delay period prior to transmitting of RTP packets of different VoIP channels, the Randomized-Delay RTP Packet Transmission/Relay Unit 500 may utilize other methods or units that may directly or indirectly introduce or cause such pre-transmission delay; for example, by using a (Cross-Channel, or Cross VoIP Channel) RTP Transmission Buffer Shuffling Unit 531 or mixing unit or re-ordering unit or re-organizing unit, which mixes or re-orders or re-organizes or modifies or shuffles the order of RTP packets within the RTP transmission buffer across different VoIP channels (or, which shuffles or mixes the order in which the RTP packets of VoIP channels exit the buffer, relative to their order of entering the buffer), based on a random or pseudo-random shuffling scheme, or based on a pre-defined already-shuffled order or pattern (e.g., indicating that RTP packets that had an original VoIP channel order of 1, 2, 3, 4, 5, and so forth within the buffer, should be shuffled in the transmission buffer to have a modified or mixed VoIP channel order, such as, 4, 3, 1, 5, 2). In such implementations, it would not be needed to also directly add a pre-transmission waiting period prior to RTP packet transmission; since the mixing or shuffling of the order of RTP packets within the RTP transmission buffer across different VoIP channels would suffice to cause a similar pre-transmission delay of RTP packets across different VoIP channels and may achieve similar goals.

It is noted that the RTP Transmission Buffer Shuffling Unit 531 implements a random or pseudo-random mixing or re-ordering of RTP packets that are buffered or queued for transmission, across multiple VoIP channels; and is not implemented merely as a FIFO buffer or as a LIFO buffer or as a cyclic buffer or other deterministic-logic buffer or deterministic-reordering buffer. Similarly, the buffer or queue of the RTP packets, that is shuffled or mixed by the RTP Transmission Buffer Shuffling Unit 531, is implemented as a non-LIFO buffer, non-FIFO buffer, non-cyclic buffer, and/or non-deterministic I/O buffer.

It is noted that the shuffling or mixing mechanism (e.g., the RTP Transmission Buffer Shuffling Unit 531) should not be employed or included or utilized in an end-point device such as a VoIP phone or a VoIP "soft client", which generates RTP packets from speech or voice or utterances of a talking user; since such mixing or shuffling of the freshly-generated RTP packets may ruin the VoIP stream; and rather, at such endpoint or VoIP phone or VoIP soft client, direct randomization should be utilized by adding a pre-transmission waiting period, rather than by shuffling an RTP transmission buffer Optionally, the components of the Randomized-Delay RTP Packet Transmission/Relay Unit 500 may be implemented using a logic circuit or a processor or a controller or other Control Logic 520, which may perform and/or command the suitable operation, and which may perform other suitable or auxiliary operations (e.g., manage the RTP transmission buffer; advance or retract a pointer in the buffer which points towards the next to-be-transmitted RTP packet; or the like).

Some embodiments of the present invention may further comprise methods and devices for VoIP traffic monitoring and analysis, for analyzing or determining or estimating a VoIP network overuse or a VoIP router overuse or a VoIP gateway overuse or an SBC unit overuse or a VoIP network element overuse or a network switch overuse; for determining or estimating one or more quantifiable characteristics of such overuse; analyzing, determining and/or estimating the average packet loss rate of a VoIP network or of a VoIP call or of a VoIP channel or of a group or set of VoIP calls or of a group or set of VoIP channels, or of a set of VoIP communications that are served by a particular VoIP router or VoIP network element; and in some embodiments, the estimating or determining of the overuse and its characteristics, which relate to a plurality of VoIP channels or to a plurality of VoIP calls, may be achieved by monitoring and analyzing VoIP traffic of a single VoIP call or of a single VoIP channel or a single VoIP communication session.

Reference is made again to FIG. 4, which demonstrates that system 400 may further comprise, optionally, two VoIP Network Analyzers (651, 652), and their functionality is discussed herein.

As mentioned above, one or more of the components of system 400, may comprise an RTP packet queue, which receives (or generates) RTP packets that are intended for transmission or for relaying, and which outputs or transmits or relays such RTP packets towards their final destination and/or towards another network element. In each such RTP packet queue, if the Input Bitrate of the RTP packet queue is higher than the Output Bitrate of that RTP packet queue, then a device overuse exists; the RTP packet queue becomes full; and the device having that RTP packet queue (e.g., VoIP router) drops RTP packet(s), and such dropped RTP packet (s) are not delivered to their intended recipient.

The Applicants have realized that typically, in a conventional VoIP system, the variance of the RTP packet loss rate among different VoIP channels that are served concurrently by the same VoIP device (e.g., the same VoIP router or SBC or gateway or network switch), is a relatively high variance; such that measuring the actual RTP packet loss rate of a single particular VoIP channel does not represent the average RTP packet loss rate of all the VoIP channels that are concurrently served by that VoIP router or VoIP network element (e.g., 50 or 100 or other high number of concurrent VoIP channels); and that the actual RTP packet loss rate of a single particular VoIP channel does not provide sufficient or adequate insights towards estimating an actual VoIP Network Overuse or VoIP Router Overuse.

The Applicants have further realized that for similar reasons, due to the high variance of the RTP packet loss rate across various VoIP channels that are served by the same VoIP router, an attempt to separately measure the RTP packet loss rate of two or three VoIP channels and then to average them, may still yield inadequate results that may be far from the actual overuse of the VoIP router and that does not necessarily represent the actual RTP packet loss rate of the numerous other VoIP channels that are being concurrently served by that VoIP router.

In a conventional system, each VoIP channel transmit an RTP packet every constant packet time; such as, every 20 milliseconds. The RTP packet loss rate of a particular VoIP channel may relate to the VoIP network overuse (or, to the overuse of a particular VoIP network element or router), and/or to the VoIP channels order within the RTP packet queue within relevant VoIP router(s) or VoIP network element(s), and/or to the RTP transmission time and data flow relative to other VoIP channels (and/or other sources of non-VoIP data) that transmit data through the same infrastructure or router.

As discussed above, embodiments of the present invention enable a VoIP device or a VoIP router or a VoIP network element, to improve QoS or QoE and/or to reduce RTP packet loss rate, by transmitting or relaying or outputting an RTP packet after a particular waiting-period or delay-period, such as, a waiting period in the range of 0 to N milliseconds (wherein N is the time-length represented by a single RTP packet, or is the RTP base frame time), and/or in a random or pseudo-random manner and while the set of time-lengths of waiting-periods are distributed generally evenly across multiple VoIP calls or VoIP channels.

In some embodiments, for example, a first-side VoIP Network Analyzer 651 may reside or may be connected at a first side of the VoIP network; whereas a second-side VoIP Network Analyzer 652 may reside or may be connected at a second, opposite, side of the VoIP network. Each VoIP network analyzer (651, 652) may be implemented as a stand-alone device or equipment, or as a dedicated or stand-alone end-point; or optionally, as a unit or sub-unit or module within another device or equipment (e.g., within a User Equipment device; within a VoIP router; within an SBC unit; within a VoIP gateway; within a network switch; or the like).

Each VoIP network analyzer (651, 652) receives or generates RTP packets that are intended for transmission or relaying, and outputs them for transmission after implementing the above-mentioned random or pseudo-random pre-transmission delay-period or waiting-period, which is evenly distributed among various RTP packets. As a result, the order of RTP packets of this particular VoIP channel inside the VoIP router queue of the VoIP network analyzer, will continuously change; and there is a low chance or minimal chance that this particular VoIP channel would suffer RTP packet loss at a rate that is significantly different (e.g., at least 25 percent greater, or at least 25 percent lower) than the average RTP packet loss across all the VoIP channels that are served by that VoIP router. By enforcing the randomized pre-transmission waiting period within a single VoIP channel (e.g., between VoIP network analyzers 651 and 652), the VoIP analyzers are able to emulate or simulate or estimate the delay that is experienced by all other VoIP channels that share the same two sides, and particularly all other VoIP channels that do not implement the pre-transmission waiting-period mechanism. Being an end-point device (and not a routing element), each VoIP analyzer (651, 652) should not perform re-ordering or mixing or shuffling of the order of RTP packets within its RTP transmission buffer or its RTP transmission queue; but rather, should implement locally its randomized pre-transmission waiting-period for outgoing RTP packets, while maintaining the original order of outgoing RTP packets.

Accordingly, measuring the RTP packet loss of a single particular VoIP channel, that enforces or deploys or applies or implements the pseudo-random and evenly-distributed pre-transmission waiting-period prior to RTP packet transmission (or relaying), would yield an RTP packet loss value that is indicative of the general or the average RTP packet loss that is likely experienced by each other VoIP channel that is served by the same VoIP router, up to a pre-defined margin of error (e.g., in some implementations, estimated to be not more than 25 percent higher or lower than the actually-measured RTP packet loss in the single measured VoIP channel).

Each VoIP network analyzer (651, 652) transmits RTP packets that have an RTP time frame which is common to all or most of the VoIP channels (e.g., 20 milliseconds). Each VoIP network analyzer (651, 652) monitors an analyzes the incoming RTP packets and determines the RTP packet loss rate (e.g., per second; per minute, per VoIP call; per T seconds; per M packets; or the like), and accordingly estimates the overall VoIP network overuse that is experience in its receive (incoming) direction; for example, network analyzer 651 is thus able to determine the VoIP network overuse in the flow direction from network analyzer 652 towards network analyzer 651; whereas, network analyzer 652 is able to determine the VoIP network overuse in the flow direction from network analyzer 651 towards network analyzer 652.

The estimation or determination of the RTP packet loss rate in one particular VoIP channel, may be performed by one or more suitable methods. For example, it may be performed in accordance with Request for Comments (RFC) 3550 of the Network Working Group, titled "RTP: A Transport Protocol for Real-Time Applications", July 2003, which is hereby incorporated by reference in its entirety, and particularly, in accordance with Section 6.4.4. thereof, titled "Analyzing Sender and Receiver Reports".

In some embodiments, for example, RTP packet loss rate is analyzed, determined and/or reported over a 30-second moving window or moving average. For example, every 5 seconds, the average value of packet loss rate is re-calculated and updated; the old or previous 5-second values are discarded from the average calculation, and new 5-second values are added to the average calculation. In some embodiments, the following formula or equation may be used for calculating the packet loss rate (PL, or PLR) over the 30-second moving-window, wherein "t" denotes a time index (e.g., in seconds) that is incremented by 1 every five seconds:

$$P\_30s[t]=(PL\_5S[t-5]+PL\_5S[t-4]+PL\_5S[t-3]+PL\_5S[t-2]+PL\_5S[t-1]+PL\_5S[t])/6$$

$$TPL=TPL+CSN-PSN-1$$

TPL indicates the total packet loss; CSN indicates the current sequence number; PSN indicates the previous sequence number. Some embodiments may take into account that the sequence number (e.g., a 16-bit sequence number) may have an upper limit, and that wrapping-around occurs when the upper limit is reached; accordingly, some implementations may perform operations to detect wrap-around and to adjust the calculation accordingly.

For example, the total number of packets lost (TNOP) is the gap or the difference between: (a) the sequence number of the last received RTP packet in the current 5-second window (denoted CLSN), and (b) the sequence number of the last received RTP packet in the previous 5-second window (denoted PLSN):

$$TNOP=CLSN-PLSN$$

$$PL\_5S[t]=TPL/TNOP$$

In some embodiments, the VoIP network analyzer starts its operation on the first received RTP packet; and the packet loss rate which relates to the time up until the first received RTP packet are disregarded. In some embodiments, the VoIP network analyzer reports its first RTP packet loss rate calculation 30 seconds after it received the first RTP packet.

The estimation or determination of the RTP packet loss rate in one particular VoIP channel, may be performed using one or more other more suitable methods; for example, by checking and comparing time-stamps and/or sequence numbers of RTP packets at pre-defined time-intervals (e.g., every 5 or 10 or 20 or 30 seconds), optionally utilizing a moving time-window or a moving average; by checking whether the sequence numbers of an RTP packet that arrived at time T1, and an RTP packet that arrived at time T2, differ from each other by a value that is equal to the time-difference (T2−T1) multiplied by the number of RTP packets expected to be received per second based on the base frame time. Some embodiments may utilize a pre-defined or pre-stored sample stream of RTP packets that are utilized by the two VoIP analyzers (651, 652) such that a receiving VoIP analyzer identify an incoming RTP stream as generally matching to a pre-stored RTP stream sample but observes that the actually incoming RTP stream lacks particular RTP packets that are part of the pre-stored RTP sample. Other suitable methods may be used to estimate or to determine the RTP packet error rate or packet loss rate or dropped packets rate, in a particular VoIP call or channel, or in a time-segment thereof.

For example, each VoIP Network Analyzer (651, 652) may calculate the RTP packet loss rate during a moving window over time; and based on the RTP packet loss rate, may further estimate or determine the VoIP network overuse. One or more suitable parameters or equations may be utilized for this purpose; for example: ENO=(IB−OB)/OB; wherein ENO is the Estimated Network Overuse; wherein IB is the measured or calculated Input Bitrate of RTP packets that enter the RTP packet queue; wherein OB is the measured or calculated Output Bitrate of RTP packets that exit the RTP packet queue; wherein IB>OB. Additionally or alternatively, the RTP Packet Loss Rate (PLR) may be determined as: PLR=L/N; wherein L is number of lost RTP packets; wherein N is the total number of transmitted RTP packets. Additionally or alternatively, the Estimated Network Overuse (ENO) may be determined as: ENO=PL/(1−PL). Other suitable equations or calculations may be used.

The RTP packets that are transmitted by each VoIP network analyzer (651, 652), may be or may comprise a pre-defined or pre-stored set or sample or batch or group of RTP packets, which may comprise any suitable type of payload (e.g., voice, audio, utterances, silence, or the like). In some embodiments, the pre-defined set of RTP packets may be stored in each VoIP network analyzer (651, 652), as an RTP batch sample that may be utilized for VoIP network analysis purposes. Optionally, multiple such RTP batch samples may be pre-stored in each VoIP network analyzer (651, 652), such as, five or ten or twenty such RTP batch samples, which may be utilized one after the other; and which may enable the VoIP system to perform continuous or generally-continuous analysis of the VoIP network overuse, utilizing one RTP batch sample after the other in order to test the VoIP network via multiple different types of samples.

In some embodiments, each VoIP network analyzer (651, 652) may optionally capture, record, store and/or save the incoming RTP packets that it receives; and may optionally decode them, in order to later demonstrate (e.g., to a human inspector, or to an automated voice quality analysis unit) the degraded voice quality during a first time-period in which network overuse was determined (e.g., had an ENO value that is equal to or greater than a particular threshold value), or conversely, to demonstrate the adequate or the satisfactory voice quality during a second time-period which lacked network overuse (e.g., had an ENO value that is smaller than the particular threshold value).

In some embodiments, optionally, each VoIP network analyzer (651, 652) may determine or estimate or calculate the mean opinion score (MOS) of the voice quality, as part of the VoIP network analysis; for example, by comparing the actually-received signal with the original signal (e.g., as originally sent), and by using a Perceptual Objective Listening Quality Analysis (POLQA) algorithm and/or a Perceptual Evaluation of Speech Quality (PESQ) algorithm. In some embodiments, the MOS value of a single VoIP channel is determined or estimated or calculated by VoIP network analyzer 651, or by a MOS estimation sub-unit thereof; and based on knowledge or an indication, that the other VoIP network analyzer 652 enforces a random or pseudo-random or non-uniform pre-transmission waiting-period, the MOS value of that single VoIP channel is determined to also be representative of (or equal to, or indicative of, or similar to) the indicative MOS value of voice quality across all the VoIP channels in that group (e.g., that are served by the same VoIP network element, or that place VoIP calls from the same one side of the VoIP network to the same other side of the VoIP network). The estimated indicative MOS value of the multiple VoIP channels (or, of the multiple VoIP calls), may be generally similar to an average of multiple MOS values for each one of the VoIP channels, if they were to be calculated or estimated separately for each VoIP channel and then averaged. The estimation or calculation of the MOS value in the single VoIP channel between the two VoIP network analyzers (651, 652), may be performed by one or more suitable methods; for example, by utilizing a pre-stored sample of RTP packets that is locally-stored and known to each one of the two VoIP network analyzers, such that VoIP network analyzer 651 receives (from VoIP network analyzer 652) an incoming stream of RTP packets, and compares the incoming stream to the locally-stored sample of RTP packets; or otherwise detects differences or lost packets or erroneous packets by comparing the incoming RTP packets to a local pre-stored copy of that sample; or without such comparison to a pre-stored sample, for example, by using MOS estimation methods that may be based on International Telecommunications Union (ITU) Telecom Standardization Sector (ITU-T) Recommendation P.862, titled "Perceptual Evaluation of Speech Quality (PESQ): An objective method for end-to-end speech quality assessment of narrow-band telephone networks and speech codecs" (February 2001), which is hereby incorporated by reference in its entirety; and/or based on ITU-T Recommendation P.863, titled "Perceptual Objective Listening Quality Prediction" (March 2018), which is hereby incorporated by reference in its entirety; and/or based on ITU-T Recommendation G.107, titled "The E-model: a computational model for use in transmission planning" (June 2015), which is hereby incorporated by reference in its entirety; and/or based on ITU-T Recommendation P.800, titled, Methods for subjective determination of transmission quality" (August 1996), which is hereby incorporated by reference in its entirety.

Figure 6:
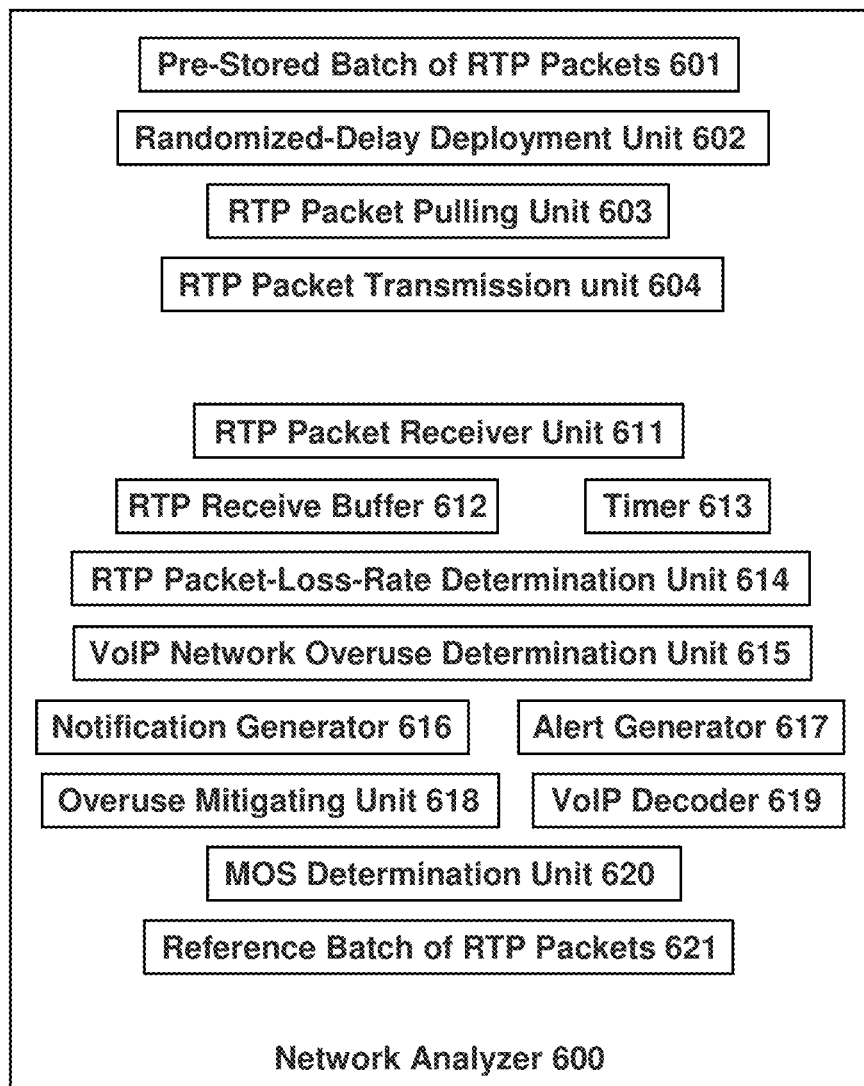
FIG. 6 is a schematic block-diagram illustration of a network analyzer, in accordance with some demonstrative embodiments of the present invention.

Reference is made to FIG. 6, which is a schematic block-diagram illustration of a VoIP Network Analyzer 600, in accordance with some demonstrative embodiments of the present invention. For example, Network Analyzer 600 may be a demonstrative implementation of VoIP Network Analyzer 651, or of VoIP Network Analyzer 652, or of other suitable VoIP network overuse estimation devices in accordance with the present invention.

VoIP Network Analyzer 600 may comprise, for example, a pre-stored batch of RTP packets 601, which are used for VoIP network analysis purposes. A Randomized-Delay Deployment Unit 602 may comprise similar components to the above-mentioned Randomized-Delay RTP Packet Transmission/Relay Unit(s); and it implements or deploys or measures a randomized (and optionally, evenly distributed) waiting-period or delay-period, after which an RTP Packet Pulling Unit 603 pulls an RTP packet from the pre-stored batch of RTP packets 601 and immediately forwards it to an RTP packet transmission unit 604 for immediate transmission (e.g., for outputting out of the Network Analyzer 600).

Network Analyzer 600 may further comprise an RTP packet receiver unit 611, which receives incoming RTP packets and stores them in an RTP receive buffer 612. A timer 613 provides the functionality of measuring or tracking time, to enable the Network Analyzer to perform measurements or calculations relative to a particular or a moving time-window or time-slot. An RTP Packet Loss Rate (PLR) determination unit 614 inspects the received and stored RTP packets; examines or analyzes their serial numbers or headers or meta-data; and determines the RTP PLR. A VoIP network overuse determination unit 615 operates to, optionally, measure or calculate the Input Bitrate and/or the Output Bitrate; and operates to estimate the Estimated VoIP Network Overuse.

Optionally, a notification generator 616 may generate, store and/or transmit to a pre-defined recipient, a notification indicating the estimated PLR, the ENO, and/or other determined or estimated parameters. Optionally, an alert generator 617 and/or an overuse mitigating unit 618 may generate an alert notification if the PLR or the ENO exceed a pre-defined threshold value, and/or may automatically perform or initiate or trigger one or more mitigating operations (e.g., an automatic temporary increase in the bandwidth of traffic that is enforced by a particular VoIP router or VoIP network element; a deployment or a re-configuration of one or more VoIP network element that may otherwise contribute to mitigation or alleviation of the network overuse). The mitigation operations may comprise one or more other operations or actions described above or herein; including, for example, changing from utilization of a first audio transcoder or coder or codec, to utilization of a second audio transcoder or coder or codec which is more resilient or more resistant to errors or is more error-tolerant (and which may be more expensive to utilize on a continuous basis, as it may require increased processing power or memory or other computing resources).

In some embodiments, the determinations and insights generated by the VoIP network analyzer, may detect VoIP network overuse period(s) and/or location(s) (e.g., particular network elements that suffer from such VoIP network overuse or that exhibit or cause such VoIP network overuse). Accordingly, the user(s) or the organization or a VoIP provider may need to reduce the total bitrate of VoIP that is transported during such VoIP network overuse periods and/or through such VoIP network overuse locations or elements. For example, the VoIP network analyzer may detect that in the routing segment "from branch A, to SIP trunk", at the time slot "from 8 AM to 11 AM", on the days "every Monday and every Tuesday and every Wednesday and every Thursday", there is a VoIP network overuse of at least 20 percent (e.g., at least one time in each such time-slot; or, at least K times, such as at least 3 times, in each such time-slot; or, in at least N percent of the packet loss rate Estimations that were performed during each such time-slot; or, substantially continuously in all or most of the packet loss rate Estimations performed during each such time-slot; or the like). Accordingly, the organization or the system may (manually, or automatically) re-configure branch A to utilize G.729A voice coder for transferring voice between 8:00 AM to 11:00 AM on these specific days, and to utilize G.711 voice coder for transferring voice during all other times. For example, a single voice channel which uses the G.729A coder (with 20 millisecond RTP packets) consumes bandwidth of approximately 31.2 kilobits per second; whereas, a single voice channel which uses the G.711 coder (with 20 millisecond RTP packets) consumes bandwidth of approximately 87.2 kilobits per second. By switching from the G.711 coder to the G.729 coder, the system reduces the bitrate by more than 20 percent, which in turn reduces or even eliminates the VoIP network overuse.

It is noted that G.729A may require greater computing or processing resources and/or more expensive equipment, and/or may slightly reduce the voice quality; and therefore, the system and/or the network administrator may not wish to continuously utilize G.729A at all times, but rather, only during time-slots in which VoIP network overuse is observed or is repeatedly observed or is predicted based on repeated past observations. Furthermore, not all the VoIP channels may be required to be switched into using the G.729A coder; rather, only a fraction or a subset of the VoIP channels may be selectively switched to utilizing the G.729A coder, to achieve the desired result in which the entirety of the total bitrate that is transported is reduced by 20 percent to cure the VoIP network overuse; for example, only 40 percent of the VoIP channels may be switched to utilizing the G.729A coder, and the exact or the approximate percentage may be calculated ad hoc by the system, and may be enforced, since the bitrate saving can be computed as demonstrated above.

In some embodiments, the mitigation operations may perform or achieve bitrate reduction by other means; for example, by increasing the RTP packet time, since at greater or longer RTP packet time, the RTP packet header consumes smaller bandwidth. Additionally or alternatively, bitrate reduction may be done by aggregating or combining bits or data from several VoIP channels into a single RTP packet; as the RTP packet header would consume a smaller bandwidth in this manner Other mitigation methods may comprise, for example: (a) increasing the allocated (or the purchased) bandwidth for VoIP communications during the VoIP network overuse time-slots; (b) utilization of RTP packet redundancy and/or FEC, particularly as an alternative to lowering the transported bitrate; (c) modifying the routing from a first network node or point to a second network node or point, for example, by detecting that the VoIP network overuse affects VoIP packet transport from branch A to SIP trunk, and therefore routing or re-routing at least some of those VoIP packets from branch A to branch B and then from branch B to SIP trunk. Other suitable mitigation operations may be triggered or performed, automatically, based on the detected or predicted VoIP network overuse.

Optionally, a VoIP decoder 619 may decode the actually-received RTP packets, and may generate a voice sample that may be further inspected or analyzed for quality analysis. Optionally, a MOS determination unit 620 may determine the MOS of the voice quality, by comparing between (i) the actually-received RTP packets as received at network analyzer 600, and (ii) an exact copy of the RTP packets that were transmitted by the other network analyzer and which may be pre-stored within network analyzer 600 as pre-stored Reference Batch of RTP packets 621, such as by utilizing a POLQA algorithm and/or a PESQ algorithm.

In some embodiments, the VoIP network overuse determination unit 615 may optionally comprise a VoIP network overuse trend (or repeated trend) detector, which detects that during a particular time-slot or time-segment (e.g., from 10 AM to 11 AM, daily; or from 3 PM to 4 PM, every business day excluding weekends), an increased VoIP network overuse (e.g., beyond a pre-defined threshold value) is repeated detected. The VoIP network overuse determination unit 615 may thus trigger automatic notification or automatic initiation of mitigation actions, prior to or during that particular time-slot or time segment; for example, increasing the allowed or authorized or purchased bandwidth of a VoIP network element; opening or activating an additional VoIP port or socket or output unit or input unit or ingress unit or egress circuit; switching from using a first audio transcoder which is less error-resilient or is less error-tolerant, to utilizing a second audio transcoder which is more error-resilient or is more error-tolerant; or the like.

Similarly, the VoIP network overuse determination unit 615 and/or its VoIP network overuse trend (or repeated trend) detector may detect that during a particular time-slot or time-segment (e.g., from 2 AM to 3 AM, daily; or from 3 AM to 4 AM, every business day excluding weekends), a lack of VoIP network overuse is detected (e.g., the determined VoIP network overuse in that time-slot is repeatedly or continuously below a pre-defined threshold value). The VoIP network overuse determination unit 615 may thus trigger automatic notification about lack of VoIP network overuse, and/or may trigger automatic initiation of suitable actions, prior to or during that particular time-slot or time segment; for example, reducing the allowed or authorized or purchased bandwidth of a VoIP network element (e.g., to reduce operating costs); closing or de-activating a secondary or an additional VoIP port or socket or output unit or input unit or ingress unit or egress circuit; switching from using a first audio transcoder which is more error-resilient or is more error-tolerant, to utilizing a second audio transcoder which is less error-resilient or is less error-tolerant (e.g., and which may be less expensive to utilize); or the like. Optionally, other sub-units may be utilized to implement such changes or mitigation operations; for example, a Transcoder Selection unit, a Transcoder Switching unit, an Allocated Bandwidth modification unit, a Remote VoIP Element configuration unit, or the like.

Furthermore, the VoIP network analyzers may provide these insights on a continuous basis, at all times, even when no VoIP calls are placed or are relayed through the VoIP network; thereby enabling a VoIP user or a VoIP network operator to reduce costs by turning-off components or by reducing allocated bandwidth or by switching to less-resilient (and less expensive) audio transcoders, during a time-slot that is repeatedly identified as a time-slot that lacks VoIP network overuse, or as a time-slot in which the VoIP network overuse (e.g., measured and re-measured every 30 seconds, or every T seconds) is repeatedly below a pre-defined threshold value.

It is noted that the VoIP network analyzer is capable to operate even if the VoIP network comprises multiple remote VoIP elements (e.g., VoIP router, VoIP gateway, SBC, relay units, network switch units, or the like), which may be of different and/or unknown types, and/or which may be from different (or unknown) vendors, and/or which may separately attempt to determine or report their own different Packet Loss rates using different formats or calculations which may not be compatible with each other and which may not be merely summed together. In contrast, the VoIP network analyzers may operate to determine the overall average RTP packet loss rate of the entire VoIP network, or of a set of one or more remote VoIP elements that serve a group of multiple (or numerous) VoIP channels or VoIP calls, in an independent and/or autonomous manner, without relying on (or, without using, or independently from) any data generated or calculated by any such remote VoIP element; particularly as data calculated by VoIP elements of different types and/or of different vendors may be non-compatible with each other and/or non-summable with each other; and the VoIP network analyzers of the present invention may be implemented as stand-alone units (e.g., stand-alone endpoint devices; a dedicated device; a "soft" client or software module running on a laptop computer or a desktop computer; or the like) that may be plugged into a VoIP network at its two sides and may autonomously and independently and reliably measure the RTP packet loss rate of the VoIP network and/or the VoIP network overuse of the VoIP network or of a particular set of one or more remote VoIP network elements.

Some embodiments provide an apparatus having a Voice over Internet Protocol (VoIP) endpoint device, comprising: an RTP packet generator, to generate Real Time Protocol (RTP) packets from audio captured by said VoIP endpoint device; an RTP packet transmission buffer, to temporarily store said RTP packets intended for transmission; an RTP packet transmission unit, configured to transmit said RTP packets to a recipient device; wherein the RTP packet transmission unit comprises a pre-transmission waiting-period enforcer, to enforce a non-uniform pre-transmission waiting-period length prior to transmission of each RTP packet that is temporarily stored in said RTP packet transmission buffer.

In some embodiments, the pre-transmission waiting-period enforcer is to enforce, for each outgoing RTP packet, a non-uniform pre-transmission waiting-period having a random or pseudo-random time-length. In some embodiments, the pre-transmission waiting-period enforcer is to enforce, for each outgoing RTP packet, a non-uniform pre-transmission waiting-period having a random or pseudo-random time-length in a pre-defined range which has: (i) a lower limit of zero; (ii) an upper limit equal to an RTP frame time-length. In some embodiments, the pre-transmission waiting-period enforcer is to enforce, for each outgoing RTP packet, a non-uniform pre-transmission waiting-period having a random or pseudo-random time-length in a pre-defined range which has: (i) a lower limit of zero; (ii) an upper limit of 20 milliseconds.

In some embodiments, the pre-transmission waiting-period enforcer is to enforce, for each outgoing RTP packet, a non-uniform pre-transmission waiting-period having a random or pseudo-random time-length in a pre-defined range which has: (i) a lower limit of zero; (ii) an upper limit equal to an integer multiply of an RTP frame time-length.

In some embodiments, said RTP packets belong to a single VoIP channel; wherein the pre-transmission waiting-period enforcer is to enforce the non-uniform pre-transmission waiting-period prior to transmission of each RTP packet of said single VoIP channel.

In some embodiments, said RTP packets belong to a single VoIP channel, wherein the pre-transmission waiting-period enforcer is to enforce the non-uniform pre-transmission waiting-period prior to transmission of each RTP packet of said single VoIP channel; wherein said RTP packets enter said RTP packet transmission buffer at an entry order, and exit said RTP packet transmission buffer at an exit order that is identical to said entry order.

In some embodiments, said VoIP endpoint device is an Internet-connected phone, which generates said RTP packets and stores said RTP packets in said RTP packet transmission buffer; wherein each one of said RTP packets is transmitted out of said Internet-connected phone after enforcement of a pseudo-random pre-transmission waiting-period.

In some embodiments, said VoIP endpoint device is an electronic device having a VoIP unit able to place VoIP calls, which generates said RTP packets and stores said RTP packets in said RTP packet transmission buffer; wherein each one of said RTP packets is transmitted out of said electronic device after enforcement of a pseudo-random pre-transmission waiting-period.

In some embodiments, said VoIP endpoint device is an electronic device selected from the group consisting of: a laptop computer comprising said VoIP unit, a desktop computer comprising said VoIP unit, a smartphone comprising said VoIP unit, a tablet comprising said VoIP unit.

In some embodiments, the pre-transmission waiting-period enforcer is to enforce differential values of time-lengths of pre-transmission waiting-periods, prior to transmitting buffered RTP packets that are intended for transmission, while maintaining an original order of said buffered RTP packets; wherein enforcement of the pre-transmission waiting-period is based exclusively on data within said VoIP endpoint device, and is performed autonomously and locally within the VoIP endpoint device; wherein said enforcement is independent of a number of concurrent VoIP calls that are performed concurrently by other devices external to said VoIP endpoint device; wherein said enforcement reduces an RTP packet loss rate of said RTP packets when they are being further relayed in a remote RTP relay unit that is external to said VoIP endpoint device and is remote to said VoIP endpoint device.

Some embodiments provide a system including a Voice over Internet Protocol (VoIP) network element, comprising: an RTP transmission buffer to temporarily store Real-Time Protocol (RTP) packets from multiple VoIP callers corresponding to multiple VoIP channels; an RTP buffer shuffling unit, to shuffle an order in which RTP packets of said different VoIP channels are stored within said RTP transmission buffer; wherein RTP packets of a first VoIP channel enter the RTP transmission buffer prior to RTP packets of a second VoIP channel, but exit the RTP transmission buffer subsequent to RTP packets of the second VoIP channel.

In some embodiments, an original order of RTP packets is maintained within the first VoIP channel; wherein an original order of RTP packets is maintained within the second VoIP channel. In some embodiments, the RTP buffer shuffling unit implements a random or pseudo-random shuffling scheme of the order of VoIP channels. In some embodiments, the RTP buffer shuffling unit implements a non-LIFO, non-FIFO, shuffling scheme of the order of VoIP channels.

In some embodiments, the RTP transmission buffer is (a) to temporarily store said RTP packets in a first VoIP channel order prior to outputting said RTP packets for transmission, and (b) to output said RTP packets for transmission at a second, different, VoIP channel order.

In some embodiments, the RTP buffer shuffling unit is to autonomously and locally shuffle the VoIP channel order of said RTP transmission buffer, prior to transmission of said RTP packets, based exclusively on data within said VoIP network element, and independently of the number of concurrent VoIP calls that are performed concurrently.

In some embodiments, the VoIP network element is a device selected from the group consisting of: a VoIP gateway, a Session Border Controller (SBC), a VoIP router, a VoIP network switch.

In some embodiments, the RTP buffer shuffling unit enforces a random or pseudo-random pre-transmission waiting-period, on a per-VoIP-channel basis, prior to transmission of each RTP packet that is buffered for transmission.

In some embodiments, the RTP buffer shuffling unit enforces a non-uniform pre-transmission waiting-period, on a per-VoIP-channel basis, in accordance with a pre-defined list of differential values of waiting-periods.

In some embodiments, a method comprises: determining an average Real-Time Protocol (RTP) packet loss rate, across a group of multiple Voice over Internet Protocol (VoIP) channels that are served by a particular VoIP routing element, by performing: (a) analyzing incoming RTP packets of a single VoIP channel of said group of VoIP channels; and determining an RTP packet loss rate for said single VoIP channel; (b) based on an indication that said single VoIP channel enforces a random or pseudo-random RTP pre-transmission waiting period, prior to transmission of buffered RTP packets, determining that said RTP packet loss rate of said single VoIP channel also indicates an overall average RTP packet loss rate of said group of multiple VoIP channels; wherein the method is implemented by utilizing at least a hardware component.

In some embodiments, the method comprises: counting the number (L) of RTP packets that were lost in transmission in said single VoIP channel; determining the total number (N) of RTP packets that were transmitted in said single VoIP channel; determining the RTP packet loss rate (PL), of said group of multiple VoIP channels, by dividing L by N. In some embodiments, the method comprises: determining a VoIP network overuse, of a VoIP network that serves said group of multiple VoIP channels, by determining PL/(1−PL).

In some embodiments, the method comprises: if the VoIP network overuse exceeds a pre-defined threshold value, then, performing at least one of: (a) generating and sending a VoIP network overuse notification to a pre-defined recipient; (b) initiating one or more pre-defined operations for mitigating VoIP network overuse; (c) initiating a temporary increase of allowed bandwidth that is enforced by a remote VoIP network element.

In some embodiments, the method comprises: detecting that a VoIP network overuse, that exceeds a pre-defined threshold value, is repeatedly determined for a same time-slot; generating a notification to increase allocated VoIP bandwidth during said time-slot due to detected existence of repeated VoIP network overuse during said time-slot.

In some embodiments, the method comprises: detecting that a VoIP network overuse, that is below a pre-defined threshold value, is repeatedly determined for a same time-slot; generating a notification to decrease allocated VoIP bandwidth during said time-slot due to detected lack of VoIP network overuse during said time-slot.

In some embodiments, the method comprises: detecting that a VoIP network overuse, that exceeds a pre-defined threshold value, is repeatedly determined for a same time-slot; during said time-slot, for which VoIP network overuse is repeatedly detected, automatically switching from (i) utilization of a first audio transcoder which transcodes audio carried by RTP packets, to (ii) utilization of a second audio transcoder which transcodes voice carried by RTP packets, wherein the second audio transcoder generates transcoding output that is more error-tolerant relative to transcoding output of the first audio transcoder.

In some embodiments, the method comprises: detecting that a VoIP network overuse, that is below a pre-defined threshold value, is repeatedly determined for a same time-slot; during said time-slot, for which lack of VoIP network overuse is repeatedly detected, automatically switching from (i) utilization of a first audio transcoder which transcodes audio carried by RTP packets, to (ii) utilization of a second audio transcoder which transcodes voice carried by RTP packets, wherein the second audio transcoder generates transcoding output that is less error-tolerant relative to transcoding output of the first audio transcoder.

In some embodiments, the method comprises: determining the overall average RTP packet loss rate of said group of multiple VoIP channels, based on a comparison between (i) an incoming stream of RTP packets of a particular sample that is incoming from a remote device via said single VoIP channel, and (ii) a locally-stored copy of said sample of RTP packets that is pre-stored locally in an apparatus that performs the analyzing of step (a).

In some embodiments, the method comprises: determining an overall VoIP network overuse of a VoIP network that serves said group of multiple VoIP channels, based on a comparison between (i) an incoming stream of RTP packets of a particular sample that is incoming from a remote device via said single VoIP channel, and (ii) a locally-stored copy of said sample of RTP packets that is pre-stored locally in an apparatus that performs the analyzing of step (a).

In some embodiments, the method comprises: determining the overall average RTP packet loss rate of said group of multiple VoIP channels, wherein said group of multiple VoIP channels are served by multiple VoIP network elements that are external to an apparatus that performs the analyzing of step (a), and independently of receiving any performance data from any of said VoIP network elements.

In some embodiments, the method comprises: determining an overall VoIP network overuse of a VoIP network that serves said group of multiple VoIP channels, wherein said group of multiple VoIP channels are served by multiple VoIP network elements that are external to an apparatus that performs the analyzing of step (a), and independently of receiving any performance data from any of said VoIP network elements.

In some embodiments, the method comprises: detecting that a VoIP network overuse, that exceeds a pre-defined threshold value, is repeatedly determined for a same time-slot; during said time-slot, for which VoIP network overuse is repeatedly detected, automatically switching from (i) utilization of RTP packets having a first time-length, to (ii) utilization of RTP packets having a second, greater, time-length.

In some embodiments, the method comprises: detecting that a VoIP network overuse, that exceeds a pre-defined threshold value, is repeatedly determined for a same time-slot; during said time-slot, for which VoIP network overuse is repeatedly detected, automatically switching from (i) utilization of a first RTP packet generation scheme in which each RTP packet comprises bits of a single VoIP channel, to (ii) utilization of a second, different, RTP packet generation scheme in which at least one generated RTP packet comprises bits of two or more different VoIP channels aggregated together into a single RTP packet.

In some embodiments, the method comprises: detecting that a VoIP network overuse, that exceeds a pre-defined threshold value, is repeatedly determined for a same time-slot for a particular VoIP network segment of VoIP transport from node A to node B; during said time-slot, automatically re-routing at least some of the RTP packets, that are sent from node A to node B, to be transported firstly from node A to node C and then from node C to node B.

In some embodiments, the determining of step (b) is performed regardless of whether other VoIP channels, of said group of multiple VoIP channels, enforce or do not enforce a random pre-transmission waiting period prior to transmission of buffered RTP packets.

In some embodiments, the method comprises: determining a Mean Opinion Score (MOS) value of voice quality in said single VoIP channel; based on said indication, determining that said MOS value of voice quality in said single VoIP channel is also representative of an indicative MOS value (or, average MOS value) of voice quality in said group of multiple VoIP channels; based on said indicative MOS value (or, average MOS value) of voice quality of said group of multiple VoIP channels, performing a mitigation operation selected from the group of: (a) re-routing VoIP packets, (b) switching from utilizing a first audio transcoder to utilizing a second audio transcoder, (c) increasing bandwidth allocated to a VoIP network segment, (d) aggregating payload of multiple RTP packets into a single multiple-payload RTP packet, (e) increasing an RTP base frame length.

In some embodiments, determining the MOS value of voice quality in said single VoIP channel is performed by at least one of: (a) a MOS calculation method that is independent of analyzing a pre-stored sample of RTP packets; (b) a MOS calculation method that compares between (i) an incoming sample of RTP packets, and (ii) a locally-stored copy of said sample of RTP packets.

In some embodiments, an apparatus comprises: a first Voice-over-Internet-Protocol (VoIP) network analyzer, (a) to receive from a second, remote, VoIP network analyzer an incoming set of RTP packets that arrived to said first VoIP network analyzer via a single VoIP channel through a remote VoIP network element; (b) to analyze the incoming set of RTP packets, and to determine an RTP packet loss rate of said single VoIP channel between the first VoIP network analyzer and the second VoIP network analyzer; (c) based on an indication that said second VoIP network analyzer transmits RTP packets while enforcing a random pre-transmission waiting-period prior to transmission of buffered RTP packets, to determine an overall RTP packet loss rate that characterizes a group of multiple VoIP channels that are served by said remote VoIP network element.

In some embodiments, the first VoIP network analyzer is a stand-alone device that plugs into the first side of said VoIP network and that communicates over said single VoIP channel with said second VoIP network analyzer that is located at said second side of said VoIP network.

Some embodiments of the present invention may be implemented by utilizing any suitable combination of hardware components and/or software modules; as well as other suitable units or sub-units, processors, controllers, DSPs, FPGAs, CPUs, Integrated Circuits, output units, input units, memory units, long-term or short-term storage units, buffers, power source(s), wired links, wireless communication links, transceivers, Operating System(s), software applications, drivers, or the like.

Any of the above-mentioned devices, units and/or systems, may be implemented by using suitable hardware components and/or software components; for example, a processor, a processing core, a Central Processing Unit (CPU), a Digital Signal Processor (DSP), an Integrated Circuit (IC), and Application-Specific Integrated Circuit (ASIC), a memory unit (e.g., Random Access Memory (RAM), Flash memory), a storage unit (e.g., hard disk drive (HDD), solid state drive (SDD), Flash memory), an input unit (keyboard, keypad, mouse, joystick, touch-pad, touch-screen, microphone), an output unit (screen, touch-screen, monitor, audio speakers), a power source (battery, rechargeable battery, power cell, connection to electric outlet), a wireless transceiver, a cellular transceiver, a wired or wireless modem, a network interface card or element, an accelerometer, a gyroscope, a compass unit, a Global Positioning System (GPS) unit, an Operating System (OS), drivers, applications, and/or other suitable components.

In some implementations, calculations, operations and/or determinations may be performed locally within a single device, or may be performed by or across multiple devices, or may be performed partially locally and partially remotely (e.g., at a remote component or a co-located component) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. An apparatus comprising:
  a Voice over Internet Protocol (VoIP) endpoint device, comprising:
  an RTP packet generator, to generate Real Time Protocol (RTP) packets from audio captured by said VoIP endpoint device;
  an RTP packet transmission buffer, to temporarily store said RTP packets intended for transmission;
  an RTP packet transmission unit, configured to transmit said RTP packets to a recipient device;
  wherein the RTP packet transmission unit comprises a pre-transmission waiting-period enforcer, to enforce a non-uniform pre-transmission waiting-period length prior to transmission of each RTP packet that is temporarily stored in said RTP packet transmission buffer;
  wherein the pre-transmission waiting-period enforcer is to enforce differential values of time-lengths of pre-transmission waiting-periods, prior to transmitting buffered RTP packets that are intended for transmission, while maintaining an original order of said buffered RTP packets;
  wherein enforcement of the pre-transmission waiting-period is based exclusively on data within said VoIP endpoint device, and is performed autonomously and locally within the VoIP endpoint device;
  wherein said enforcement is independent of a number of concurrent VoIP calls that are performed concurrently by other devices external to said VoIP endpoint device;
  wherein said enforcement reduces an RTP packet loss rate of said RTP packets when they are being further relayed in a remote RTP relay unit that is external to said VoIP endpoint device and is remote to said VoIP endpoint device.

2. The apparatus of claim 1,
  wherein the pre-transmission waiting-period enforcer is to enforce, for each outgoing RTP packet, a non-uniform pre-transmission waiting-period having a random or pseudo-random time-length.

3. The apparatus of claim 1,
  wherein the pre-transmission waiting-period enforcer is to enforce, for each outgoing RTP packet, a non-uniform pre-transmission waiting-period having a random or pseudo-random time-length in a pre-defined range which has: (i) a lower limit of zero; (ii) an upper limit equal to an RTP frame time-length.

4. The apparatus of claim 1,
  wherein the pre-transmission waiting-period enforcer is to enforce, for each outgoing RTP packet, a non-uniform pre-transmission waiting-period having a random or pseudo-random time-length in a pre-defined range which has: (i) a lower limit of zero; (ii) an upper limit of 20 milliseconds.

5. The apparatus of claim 1,
wherein the pre-transmission waiting-period enforcer is to enforce, for each outgoing RTP packet, a non-uniform pre-transmission waiting-period having a random or pseudo-random time-length in a pre-defined range which has: (i) a lower limit of zero; (ii) an upper limit equal to an integer multiply of an RTP frame time-length.

6. The apparatus of claim 1,
wherein said RTP packets belong to a single VoIP channel,
wherein the pre-transmission waiting-period enforcer is to enforce the non-uniform pre-transmission waiting-period prior to transmission of each RTP packet of said single VoIP channel.

7. The apparatus of claim 1,
wherein said RTP packets belong to a single VoIP channel,
wherein the pre-transmission waiting-period enforcer is to enforce the non-uniform pre-transmission waiting-period prior to transmission of each RTP packet of said single VoIP channel;
wherein said RTP packets enter said RTP packet transmission buffer at an entry order, and exit said RTP packet transmission buffer at an exit order that is identical to said entry order.

8. The apparatus of claim 1,
wherein said VoIP endpoint device is an Internet-connected phone, which generates said RTP packets and stores said RTP packets in said RTP packet transmission buffer;
wherein each one of said RTP packets is transmitted out of said Internet-connected phone after enforcement of a pseudo-random pre-transmission waiting-period.

9. The apparatus of claim 1,
wherein said VoIP endpoint device is an electronic device having a VoIP unit able to place VoIP calls, which generates said RTP packets and stores said RTP packets in said RTP packet transmission buffer;
wherein each one of said RTP packets is transmitted out of said electronic device after enforcement of a pseudo-random pre-transmission waiting-period.

10. The apparatus of claim 9,
wherein said VoIP endpoint device is an electronic device selected from the group consisting of:
a laptop computer comprising said VoIP unit,
a desktop computer comprising said VoIP unit,
a smartphone comprising said VoIP unit,
a tablet comprising said VoIP unit.

* * * * *